United States Patent [19]

Persaud et al.

[11] 4,368,514

[45] Jan. 11, 1983

[54] MULTI-PROCESSOR SYSTEM

[75] Inventors: Ian K. Persaud, Lodi, N.J.; Joseph B. Heinemann, New York, N.Y.

[73] Assignee: Timeplex, Inc., Rochelle Park, N.J.

[21] Appl. No.: 143,790

[22] Filed: Apr. 25, 1980

[51] Int. Cl.[3] .................... G06F 13/00; G06F 15/16
[52] U.S. Cl. ................................................. 364/200
[58] Field of Search ..................... 364/200 MS File

[56] References Cited

U.S. PATENT DOCUMENTS

| | | | |
|---|---|---|---|
| 3,634,830 | 1/1972 | Baskin | 364/200 |
| 3,701,977 | 10/1972 | Mendelson et al. | 364/200 |
| 4,209,839 | 6/1980 | Bederman | 364/200 |
| 4,219,873 | 8/1980 | Kober et al. | 364/200 |

Primary Examiner—Mark E. Nusbaum
Assistant Examiner—Thomas M. Heckler

Attorney, Agent, or Firm—Gottlieb, Rackman & Reisman

[57] ABSTRACT

There is disclosed a multi-processor system having a master processor and a plurality of slaves. Each processor is provided with its own memory. Although each slave processor can access only its respective memory, the master processor can access either its own memory or any one of the slave memories. Maximum throughput (efficiency) is achieved by suspending operation of a single slave processor for only a single memory cycle, i.e., the time required for the master processor to access the respective slave memory. Each processor/memory is on a single card, with all of the cards being connected to a common bus. The cards are virtually identical, and master/slave distinctions are determined by a single slot bit on each card. A unique addressing scheme is implemented for access from the master to a selected slave.

29 Claims, 18 Drawing Figures

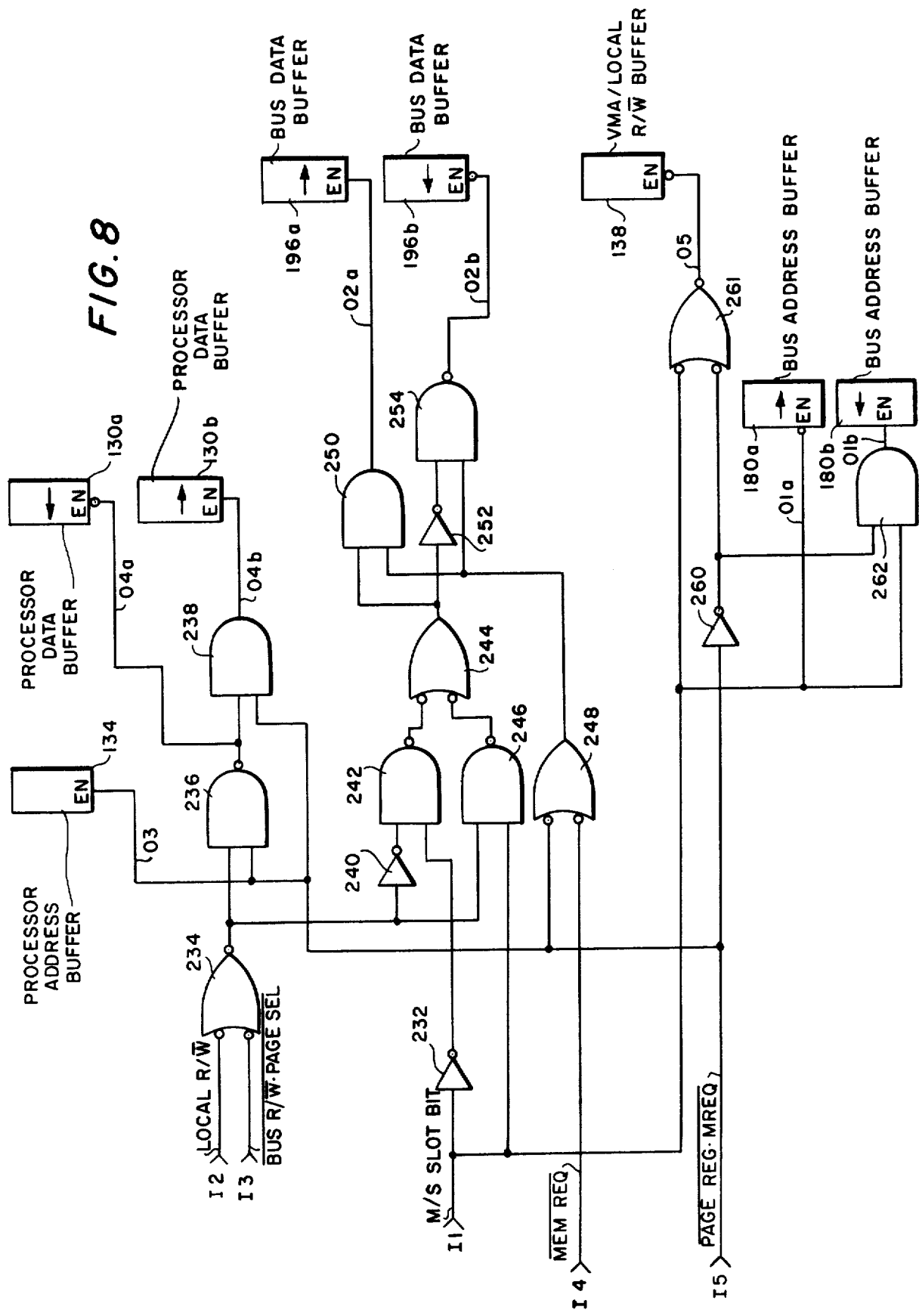

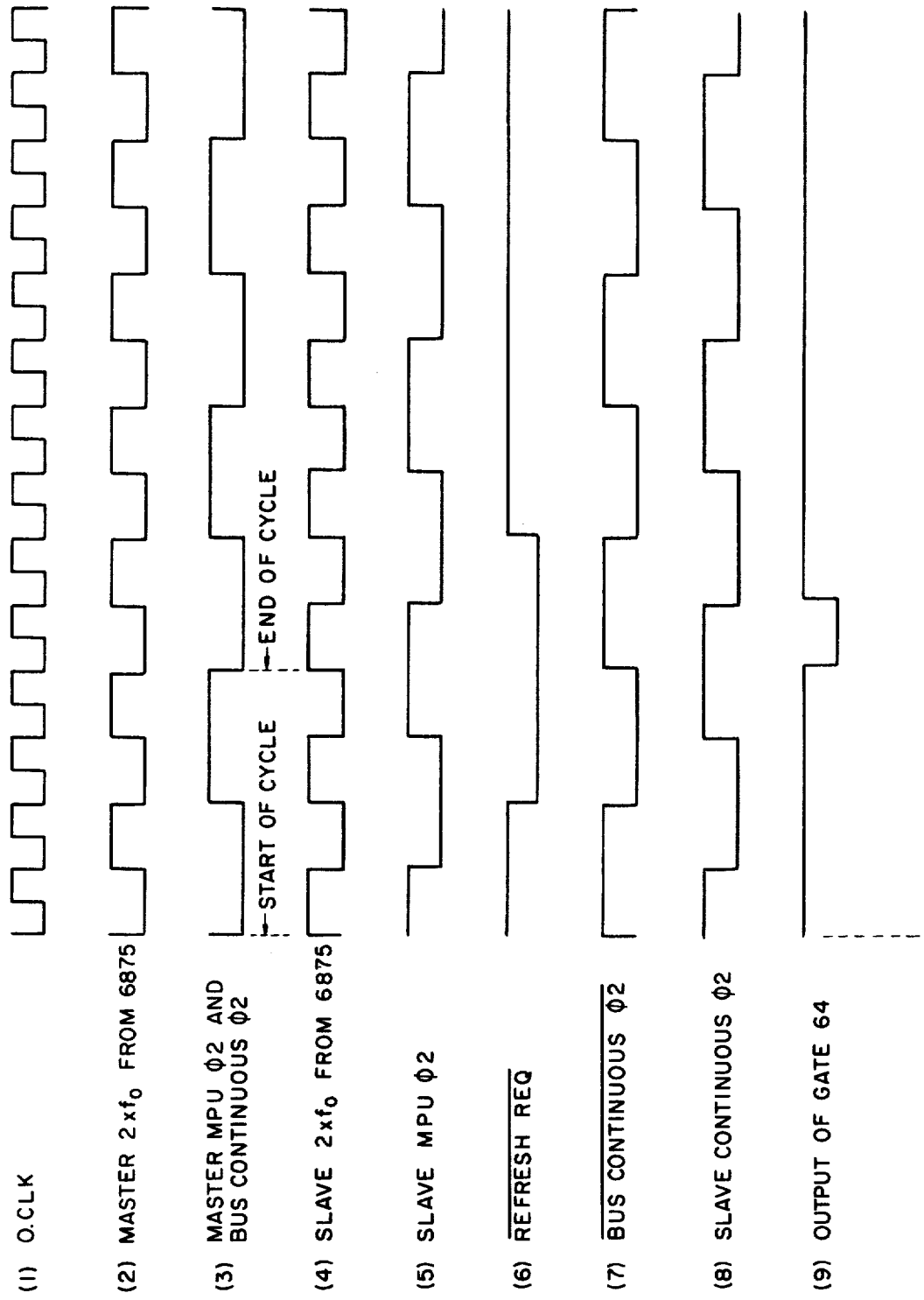

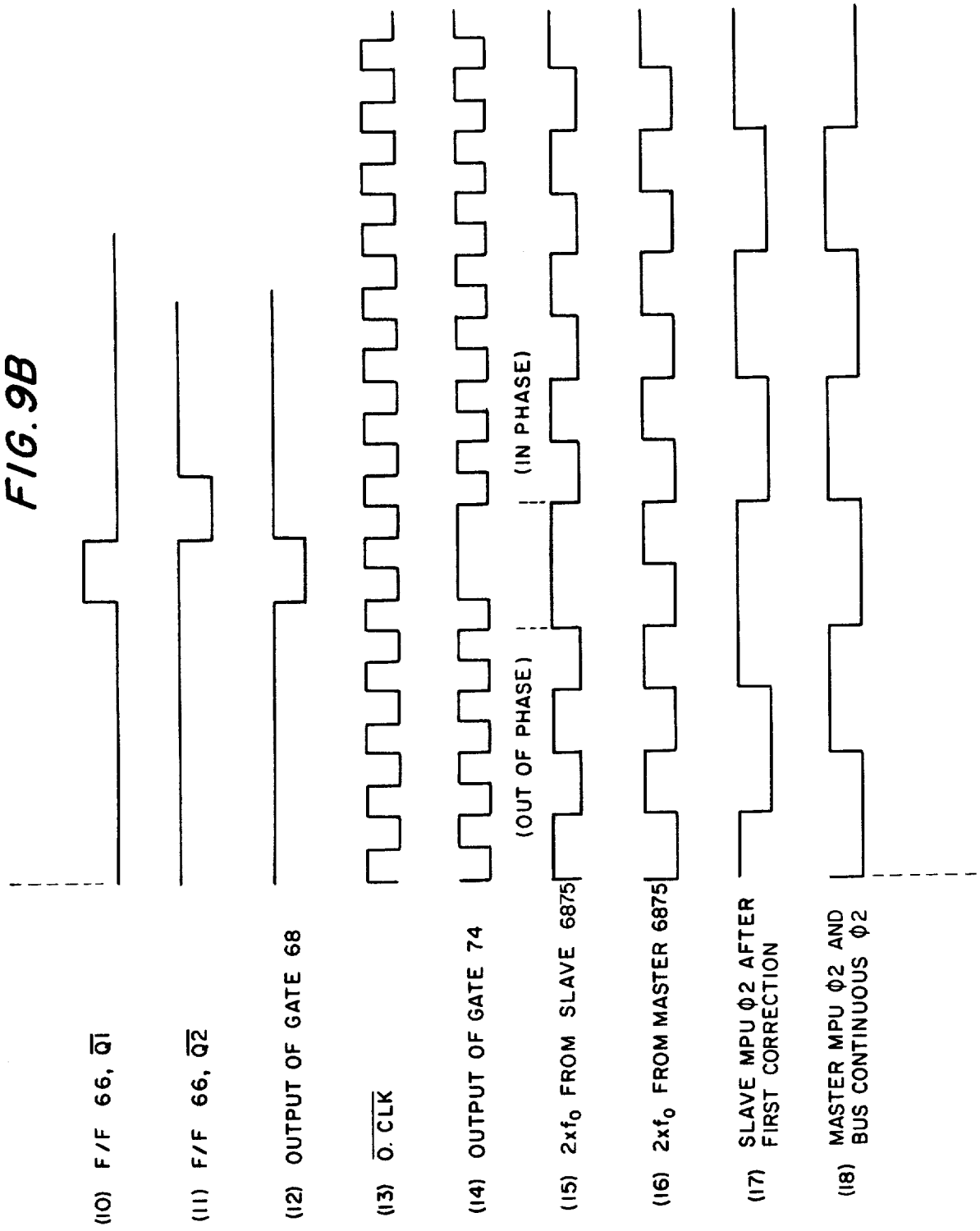

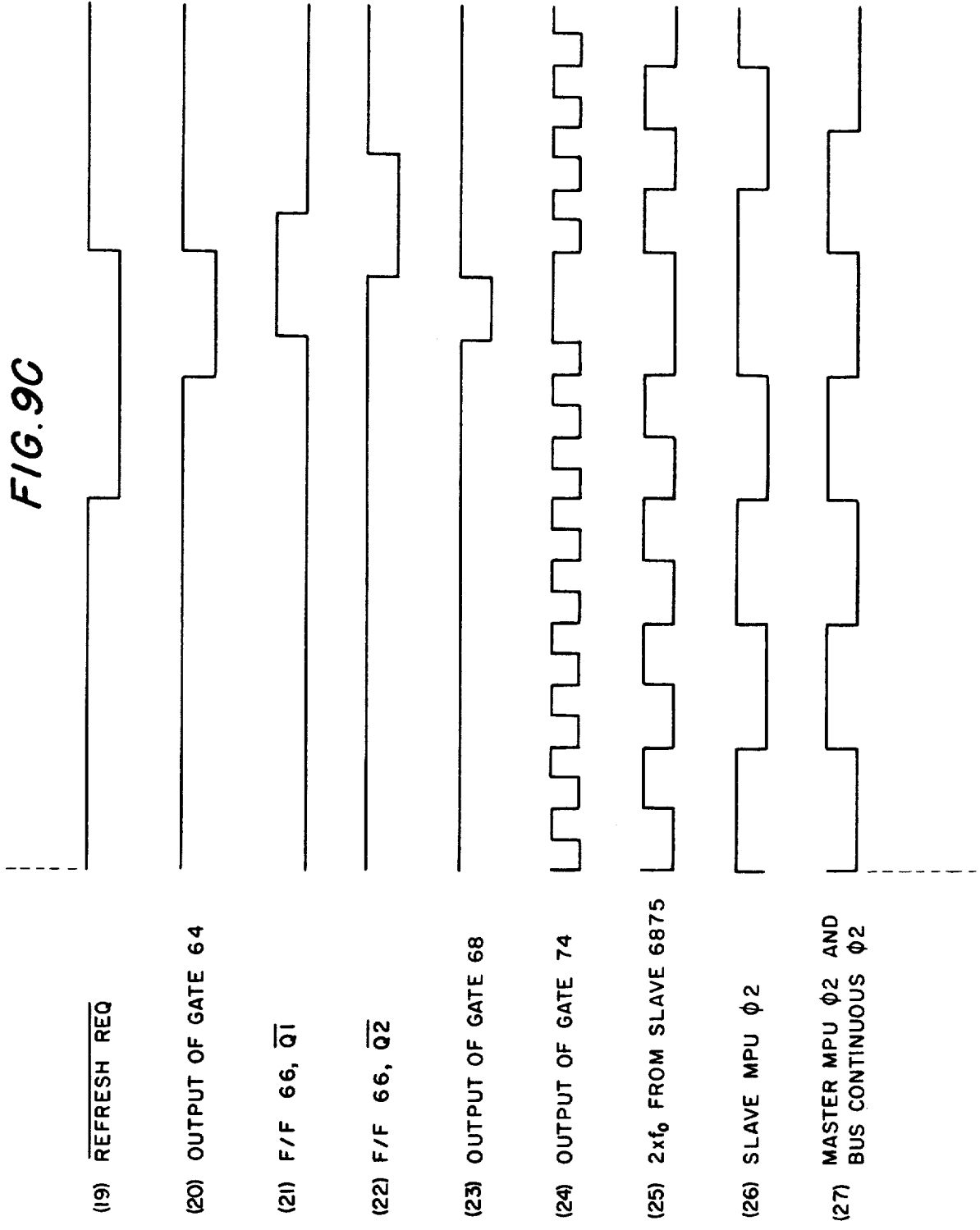

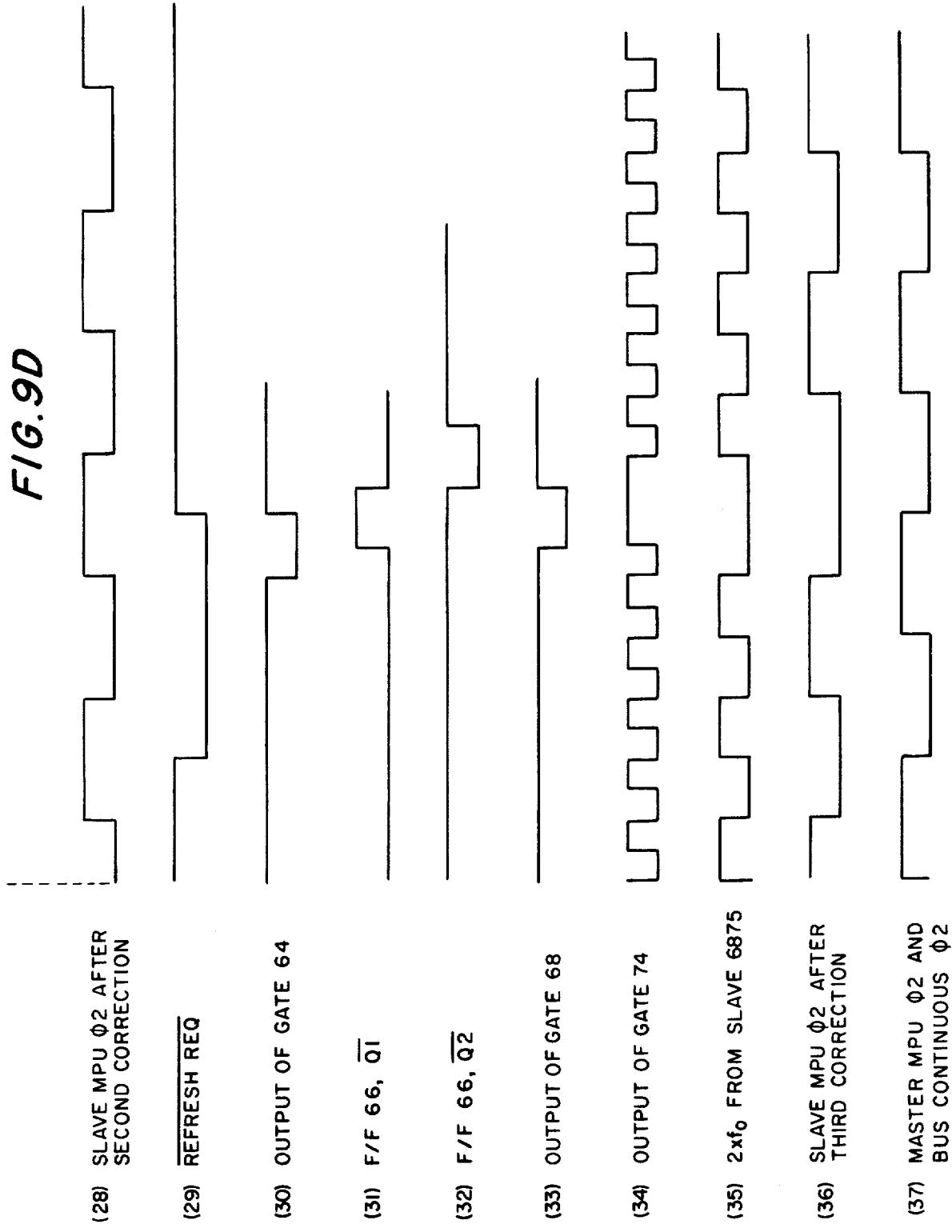

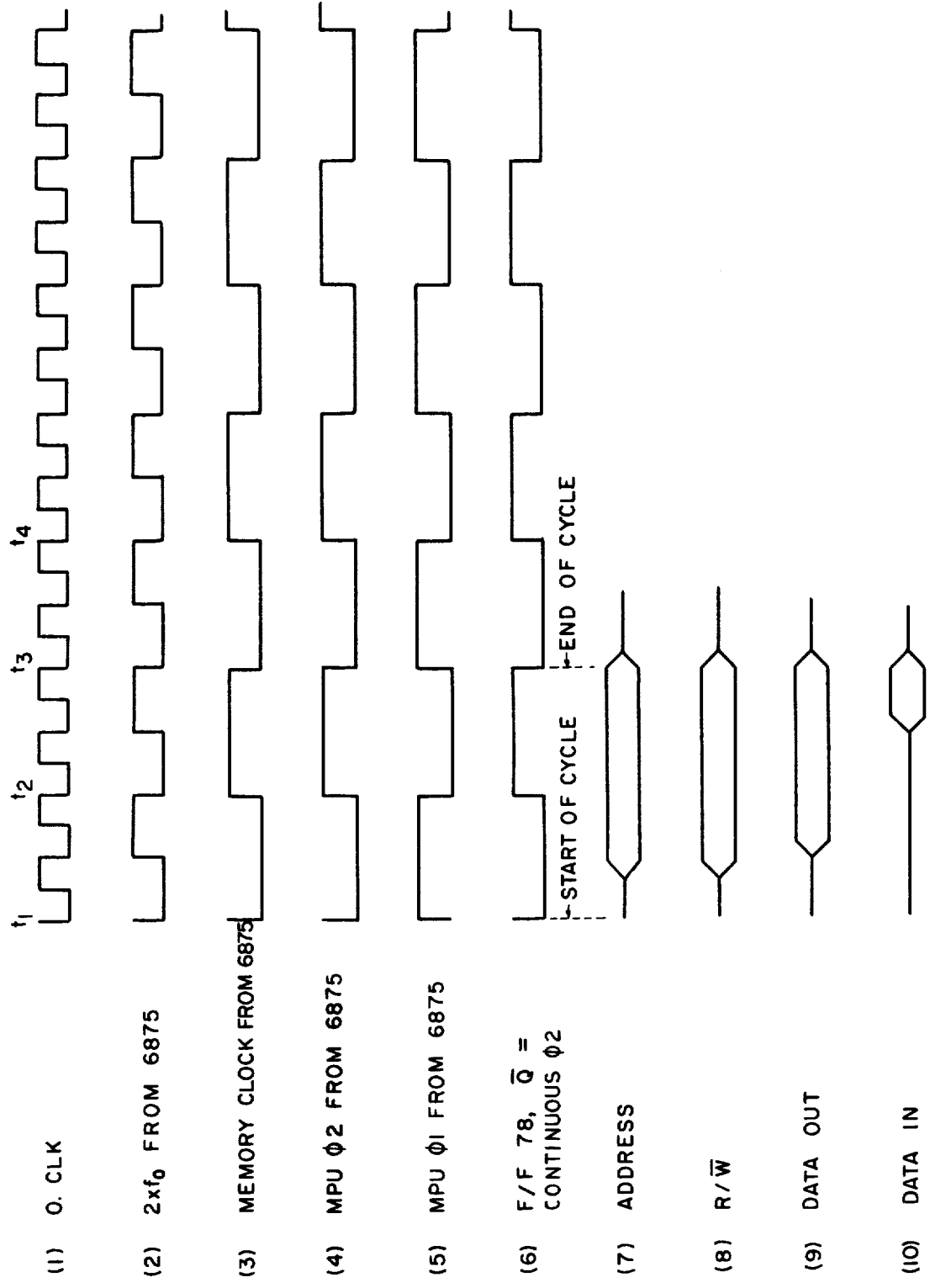

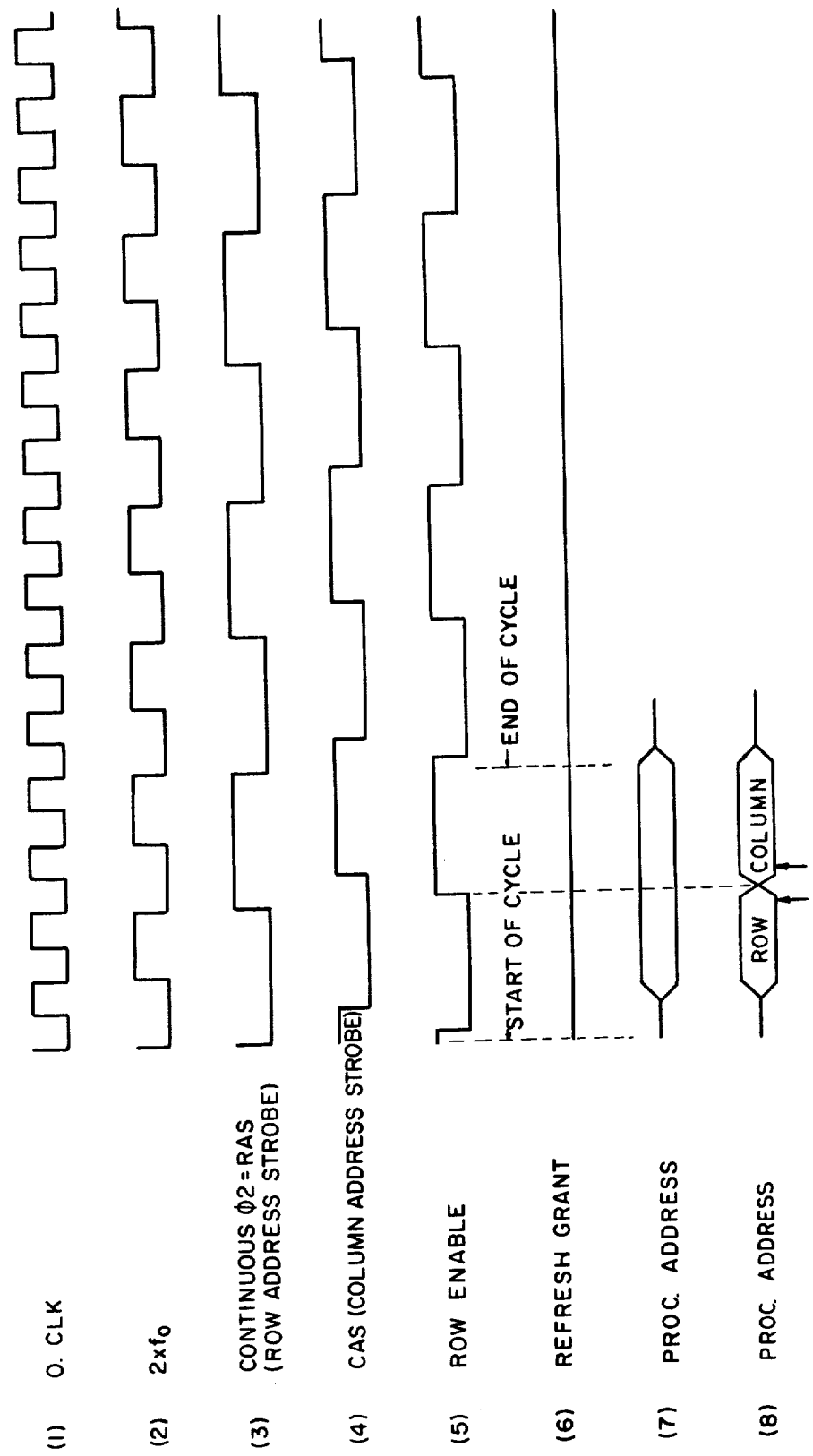

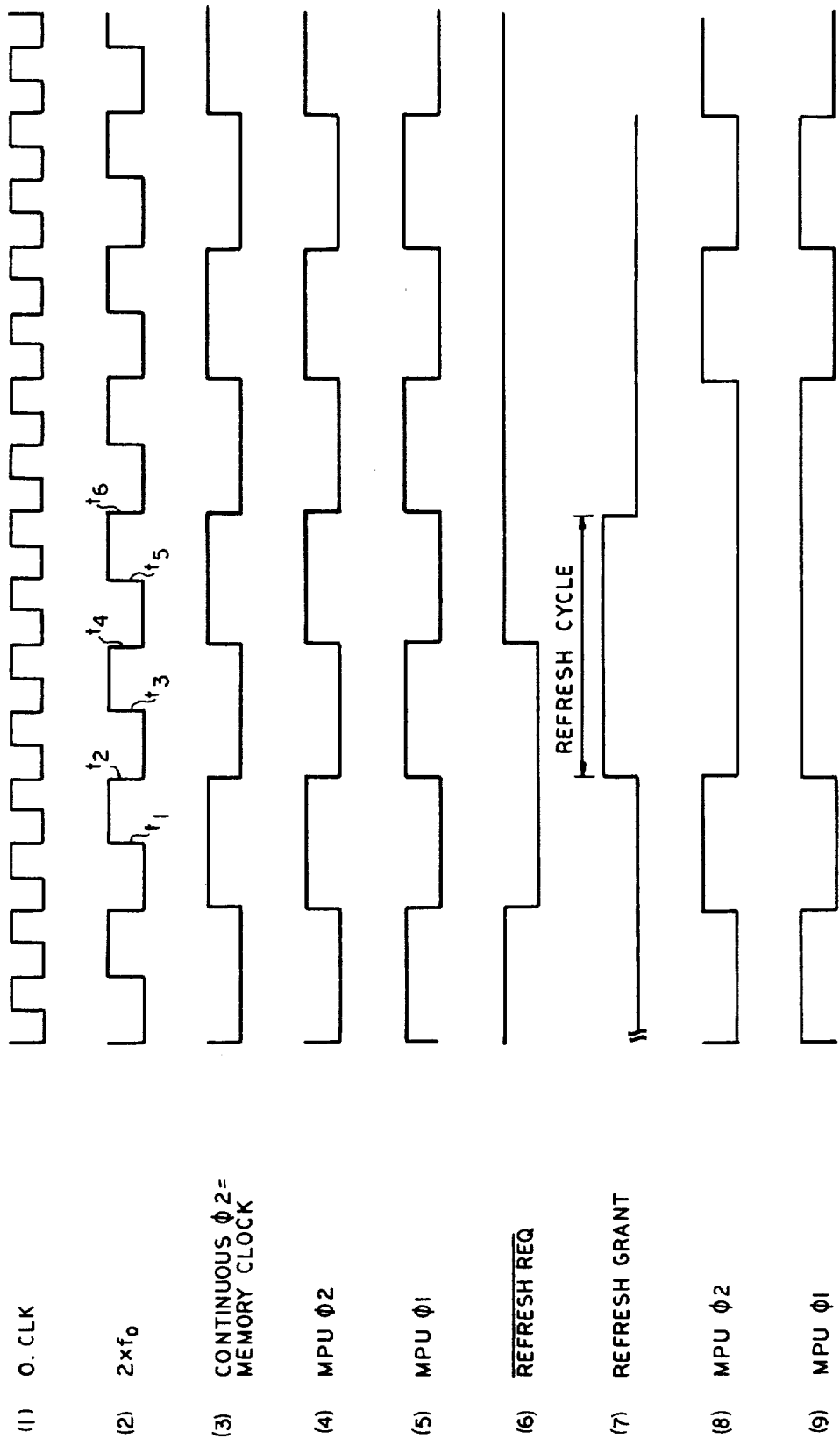

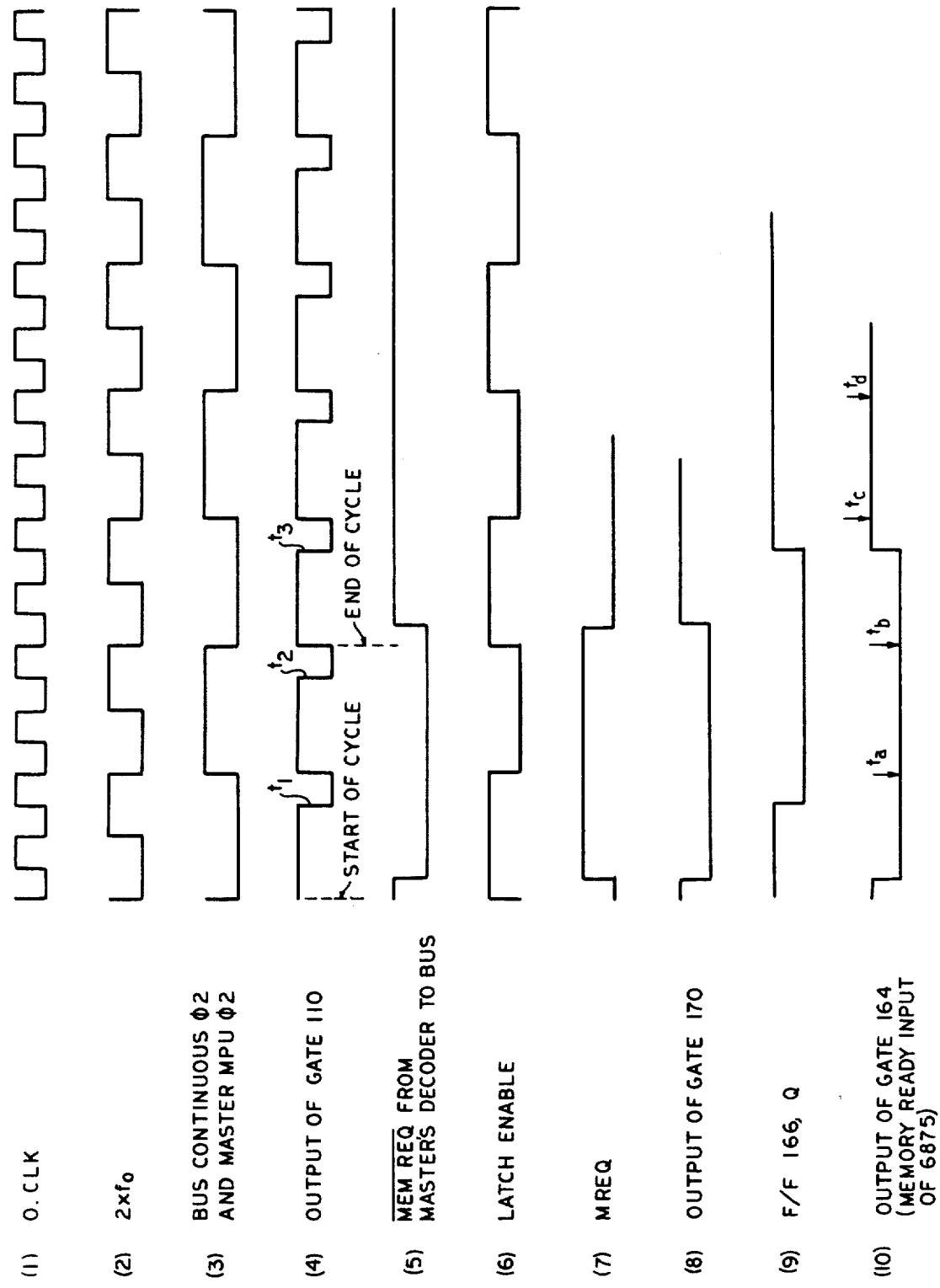

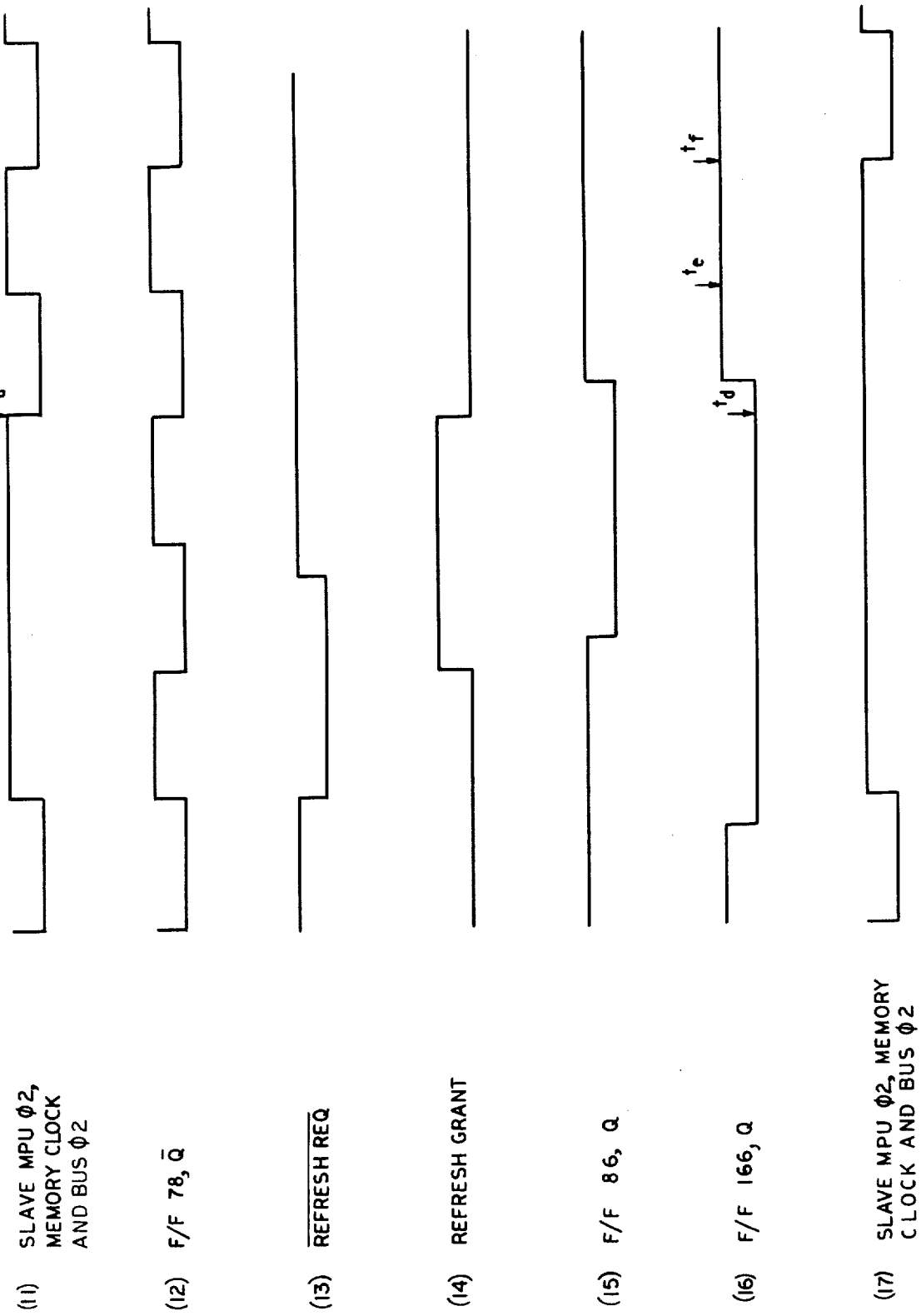

MULTI-PROCESSOR SYSTEM

This invention relates to multi-processor systems, and more particularly to shared-memory systems which exhibit minimal impact on throughput.

There are many situations in which processors have to communicate with each other by accessing shared memories. The basic problem in all such systems is in the resolution of conflicts between processors seeking access to the same memory. Not only is a priority mechanism often required, but the throughputs of individual processors can be reduced if a processor is hung up (waiting) while another processor accesses a required memory.

It is a general object of our invention to provide a multi-processor system in which the throughputs of individual processors are not significantly reduced despite the fact that memories are shared.

There are many prior art techniques for allowing communication between processors. One such technique is to use two buffer memories for each pair of processors which must communicate with each other. One buffer memory is used by one processor for temporarily storing information to be passed on to the other, and the other buffer memory is used to communicate in the opposite direction. The system operates on a first-in-first-out basis, with the first data stored in a buffer memory by one processor being the first data read out by the other. The efficiency of such a system is very low, not to mention the extensive additional hardware which is required.

Inter-processor communication is also possible by allowing each processor to request from another use of the latter's memory, with the latter processor granting the request when it is ready to do so. A major problem with this approach is that until the request is actually granted, the requesting processor must wait. Instead of impacting throughput in this way, it is possible for the requesting processor to set a latch which indicates that it is requesting access to the memory of another processor, and for the requesting processor to then proceed until it receives a signal from the other processor that the request has been granted. But the setting and polling of latches is not efficient, and can result in the waste of many processor cycles.

A common technique for allowing communication between processors is to generate interrupts, with one processor interrupting the operation of another. But interrupt processing is very inefficient from a time standpoint because upon receipt of an interrupt request, a processor can take several cycles doing "housekeeping" chores such as storing away its present state.

Similarly, systems which allocate respective time slots for each processor to access a shared memory are terribly wasteful of time because if a particular processor does not require an access to the memory in its turn, the memory is not utilized by any processor.

A highly efficient prior art technique is that involving the sharing of a memory by two processors, with the two processors being 180 degrees out of phase with each other; each processor accesses the memory when the other has no need for it. Such systems, in addition to being efficient, also require minimal additional hardware. Unfortunately, the technique has no application to systems utilizing three or more processors.

Briefly, in accordance with the principles of our invention, at least three processors are provided, with each having its own respective memory. Typically, each processor/memory is contained on a single card, and all cards are connected over a common backplane bus. One of the processors is designated a master, and all of the others are slaves. For the most part the cards are all the same, and each processor is made to function as the master or as a slave by the potential on a single slot bit wired in the backplane.

Each slave processor can gain access only to its respective memory. The master can gain access not only to its own respective memory, but also to any of the slave memories. The master generates synchronizing signals which are applied over the backplane to each of the slave processors. Because all of the processors are synchronized to the master processor, when the master does access a slave memory, it has to inhibit operation of the respective slave processor for only a single memory cycle, i.e., the time required for the master to access the slave memory. All other slaves continue their processing. The net result is that only one slave is inhibited from operating when the master wants access to its respective memory, and even that slave is inhibited for the shortest possible time. (It should be possible with additional hardware not to inhibit the selected slave at all if it does not require access to its own memory, although this is not done in the illustrative embodiment of the invention.)

Although not limited to any particular application, this architecture is particularly suitable for use in a statistical communication multiplexer. At one end of a high-speed link, the multiplexer accepts data from 64 low-speed channels, formats this data, and sends it out on the single high-speed link. At the other end of the link, a demultiplexer (typically, the same kind of machine but operated in a different mode) accepts the formatted data from the high-speed link, deformats it, and sends the data to 64 low-speed channels. At each end of the link, each of sixteen slave processors operates on four respective low-speed channels. An additional master processor interfaces to the high-speed link. At the transmitting end, the slave processors store channel data in their respective memories. The master processor accesses the slave memories in sequence, stores the retrieved data in its own master memory, and following appropriate processing applies the formatted data to the high-speed link. At the receiving end of the link, the master processor stores incoming data in its own memory, and then distributes the data to the slave memories. The slave processors access data in their respective memories, and output the data to the low-speed channels.

When the master processor wants to access a slave memory, it loads a 4-bit page register with a code identifying the slave memory of interest. The 4-bit page register code is outputted over the bus along with a 16-bit address and a memory request signal. The selected slave processor recognizes its 4-bit address, and transfers control over its memory to the incoming address and control signals from the master only when there is a memory request signal on the bus. The slave processor simply suspends its operation for a single memory cycle while the master reads data from, or writes data into, the slave memory. During this same cycle, all of the other slave processors may access their respective memories without any interference.

The details of the data transferred among processors via the slave memories are not important for an understanding of the present invention. However, a brief description of a typical application, that of the multiplexer described above, may be useful. Each slave memory includes a control block, and a plurality of data buffers (one for each of the four respective channels). The control block includes flags and pointers which the master processor examines as part of the "handshaking" whenever data may have to be delivered to a slave memory or read from it. The flags inform the master processor of the status of the slave processor and the channels which it controls, and the pointers point to specific addresses in the slave memory which, for example, might contain data which is required by the master processor. Similarly, the master can set flags and pointers in the control block, and store in the buffer areas data to be processed by a slave. The master, of course, may maintain its own set of pointers and flags, so that it can verify what each slave processor is doing. The point is that all of the communication required between the processors can be accomplished, even though each slave can act on only its respective memory, by allowing the master to access all of the memories. It is even possible in such a scheme for slave processors to communicate with each other via the master.

It is apparent that in a system of this type it may be necessary that the throughput not be seriously affected even though the individual memories may be accessed from two different processors. If a slave processor is held up excessively (which might be the case, for example, were all slave processors to cease functioning when the master utilizes the common bus to access a particular slave memory), it is possible that a slave processor would miss a data character on one of its respective channels. On the other hand, to slow down the main processor (for example, by having the master wait while a slave memory to which it wants access is being accessed by the respective slave processor) might result in allowing insufficient time for the master to process data from all of the channels. In short, it is not only the overall architecture which is important, it is also important that the operation of only a single slave processor be suspended at any one time, and that the suspension last for a minimum duration.

Although in the illustrative embodiment of the invention, the processors are shown communicating only with memories, it is to be understood that they communicate with I/O devices in general—such as USART's in the case of a multiplexer. The I/O devices have respective addresses and are connected to the data bus just as a memory. Memories alone are illustrated in order not to further complicate the drawings.

For ease of manufacture, the cards containing the processors and memories are virtually identical. This means that only one type of card must be stocked. One pin input of each card is connected in the backplane to either a positive potential or ground. If the "slot bit" potential is low, the processor on the respective card functions as the master; all other processors, on cards whose slot bits have a value of 1, function as slaves. Only a single card should have a 0 value for its slot bit since there can be only one master. (As will be described below, the master card includes an oscillator, refresh control circuitry, and drivers for transmitting signals over the common bus to all the slave cards. These few components may be omitted from the slave cards should it be desired to reduce costs. Similarly, those chips which are necessary only for proper slave operation can be omitted from a master card.)

The operations of the slave processors are synchronized to the operation of the master processor. The slave processor clocks are referenced to the master processor clocks, but the slave processors actually generate their own clock signals.

One of the most popular microprocessor chip sets is the 6800 series first marketed by Motorola Inc. Although the various microprocessors in this series are very powerful, it is extremely difficult to synchronize the operations of a plurality of these devices to each other. Each processor cycle has two phases, 01 and 02. During the first phase, an address is placed on the address bus, and during the second phase data is written into, or read out of, a memory at the specified address. In order for a plurality of processors to be synchronized to each other so that the master can assume control over a slave memory while disabling a slave processor for only one cycle, it is apparent that all of the processors must have their 01 and 02 clock signals synchronized to each other.

The Motorola 6875 chip is a 2-phase clock generator/driver which functions to generate the 01 and 02 signals for a connected processor. Theoretically, it would be possible to utilize only one clock generator, for example, on the master processor card, and to transmit the 01 and 02 signals throughout the system to control all of the slave processors as well as the master. However, due to various design considerations (e.g., one mother board clock bus to condition and protect, ease of designing a single printed circuit card for functioning as a master or slave, and general good design practice), it is advantageous to use a single oscillator clock, and a separate 6875 chip on the master and all slave cards to generate the phase clocks required by the respective processors.

In the prior art there has been no way to synchronize the 6875 chips to each other. The basic clock source for each clock generator is an oscillator whose frequency is four times that of the 01 and 02 clock signals. Although the same oscillator clock can be distributed to all cards, not only can the 01 and 02 clocks on different clock generators be 180 degrees out of phase with each other, they can also be 90° and 270° out of phase with each other. Following system initialization with the generation of a conventional reset signal, the clock generators start to run. But when this happens, there is no way to tell whether a clock generator will come up at the beginning of a 01 or 02 phase, or in the middle of one of the phases. Thus there is a very great problem in synchronizing all of the clock generators to each other.

The clock timing is further complicated by the need to refresh dynamic memories, if dynamic memories are used as they are in the illustrative embodiment of the invention. If all of the dynamic RAMs are not refreshed simultaneously, the master processor operation may be suspended for an extra cycle if the slave memory to which it needs access is being refreshed. For maximum efficiency, normal operations of all of the processors in the system should be suspended together for a single cycle while a refresh operation takes place, and then all normal processor operations should resume in synchronism.

In the illustrative embodiment of the invention, what is done is to generate a continuous 02 clock signal on each card, a signal which is never suspended even though the 02 signal from each clock generator can be suspended (e.g., during refresh of dynamic memories, or when the master accesses a slave memory). The continuous 02 signal (1.5 MHz) from the master is distributed over the bus to all of the slave processors, together with the master clock signal (6 MHz). A synchronizing circuit on each slave processor card operates on the continuous 02 signal from the master, the continuous 02 signal generated by the slave, and the oscillator clock to synchronize the local 6875 clock generator so that it is in synchronism with the 6875 clock generator on the master card. It is in this way that all of the processors are synchronized to each other, despite the fact that when power is first turned on the clock generators may be out of synchronism, and despite the fact that there is no distribution of 01 and 02 clock signals over the bus.

Before proceeding to a detailed description of the illustrative embodiment of the invention, it will be helpful to understand the addressing scheme. The master memory and each of the slave memories is a 16K device, which recognizes the addresses 0000 through 3FFF (in Hex notation). It requires 14 bits to specify one of 16K addresses. The two most significant address bit inputs to each memory may be wired to 0 bit levels. The master accesses its own memory by generating addresses in the 0000–3FFF range. When the master wants to access a slave memory, it generates an address in the 4000–7FFF range. An address in this range requires a bit value 1 for the 15th address bit. Although an address in the range 4000–7FFF may actually be transmitted over the 16-bit address bus (a 16-bit wide bus is used to allow for memory expansion) to the selected slave memory, the two most significant address bits are ignored by all slave memories since the respective inputs are wired to 0 bit values. In other words, the 15th address bit from the master is not actually used by a slave memory so that there is an automatic translation of a master address in the 4000–7FFF range to an address in the 0000–3FFF range. The 15th address bit generated by the master processor is simply used to determine when the address should be used on a slave card to access the respective slave memory.

Although the master-generated address is always transmitted over the common bus to all of the slave cards, only one of them operates on this address to control an access to its respective memory while its own processor operation is suspended. Before the master actually acts on a slave memory, it first loads a page register with a 4-bit data value which identifies one of the 16 slave cards. (The page register is loaded when the master generates the address 8000, which address is decoded in order to control loading of the page register with the four least significant bits on the master's data bus.) Each slave processor is provided with a wired address determined by four slot identification bits. When a slave card recognizes the page register contents (which are transmitted over the common bus) as corresponding to its own card address and a memory request signal on the bus, it applies the 14-bit effective address which is transmitted by the master processor to its own memory to access the desired location.

Throughout this description, references are made to a master processor accessing a slave memory during only a single cycle, after which the slave processor can continue on its own having had its operation suspended for only a single cycle. In actual practice, there are usually several accesses in succession which the master must make to a slave memory. Following loading of the page register with the identification of the slave card, several successive accesses to the selected slave memory will follow. That is because in the usual case the master must read from, or write into, a slave memory several successive bytes. In such a case, the slave processor operation is suspended for only as many cycles as there are data bytes to be transferred. Thus when references are made to a slave being inhibited from operating for only a single cycle, what is meant is that if only a single data transfer is necessary, then the slave is interrupted for only a single cycle. But if more than one transfer is required, then of course the slave is inhibited from operating for more than one cycle. References to the suspension of operation of a slave processor for only a single cycle are intended to cover only the case where a single data transfer is required. (In the case of dynamic microprocessors such as those in the 6800 series, the suspension is time limited because if a processor clock is stopped for too long a time period, the internal register data can be lost; the maximum number of successive master accesses to a selected slave memory should be controlled by the system software.)

Further objects, features and advantages of our invention will become apparent upon consideration of the following detailed description in conjunction with the drawing, in which:

FIG. 8 is a detailed schematic of the "bus turn-around logic" block 200 of FIG. 6; and FIGS. 9A–14B are timing waveforms which will facilitate an understanding of the invention.

CARD CONNECTIONS TO BUS, AND CLOCK AND BUS SIGNALS

Figure 1:
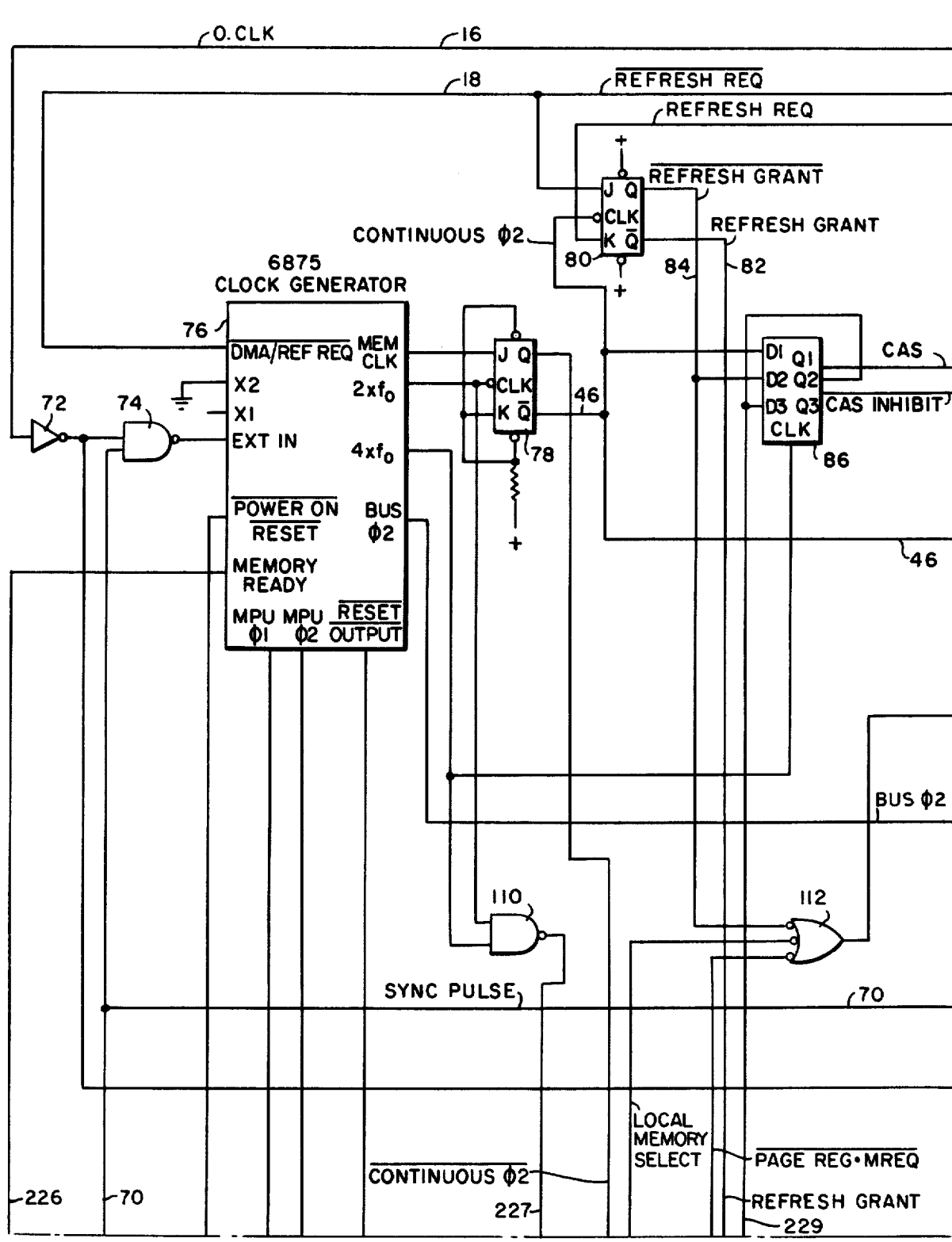
FIGS. 1–6 depict the illustrative embodiment of the invention, with FIG. 7 showing the arrangement of the first six figures.
Figure 2:
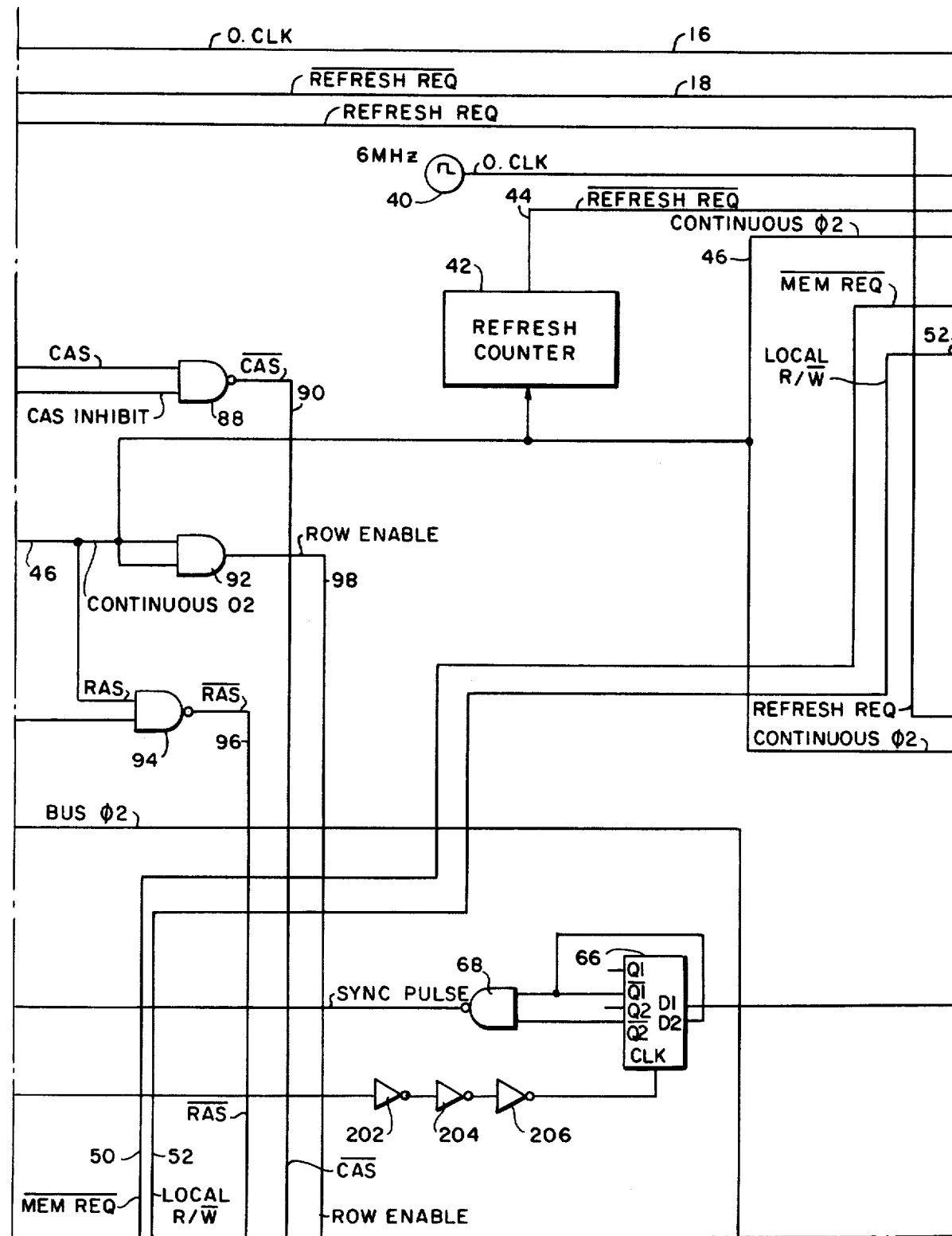
Figure 3:
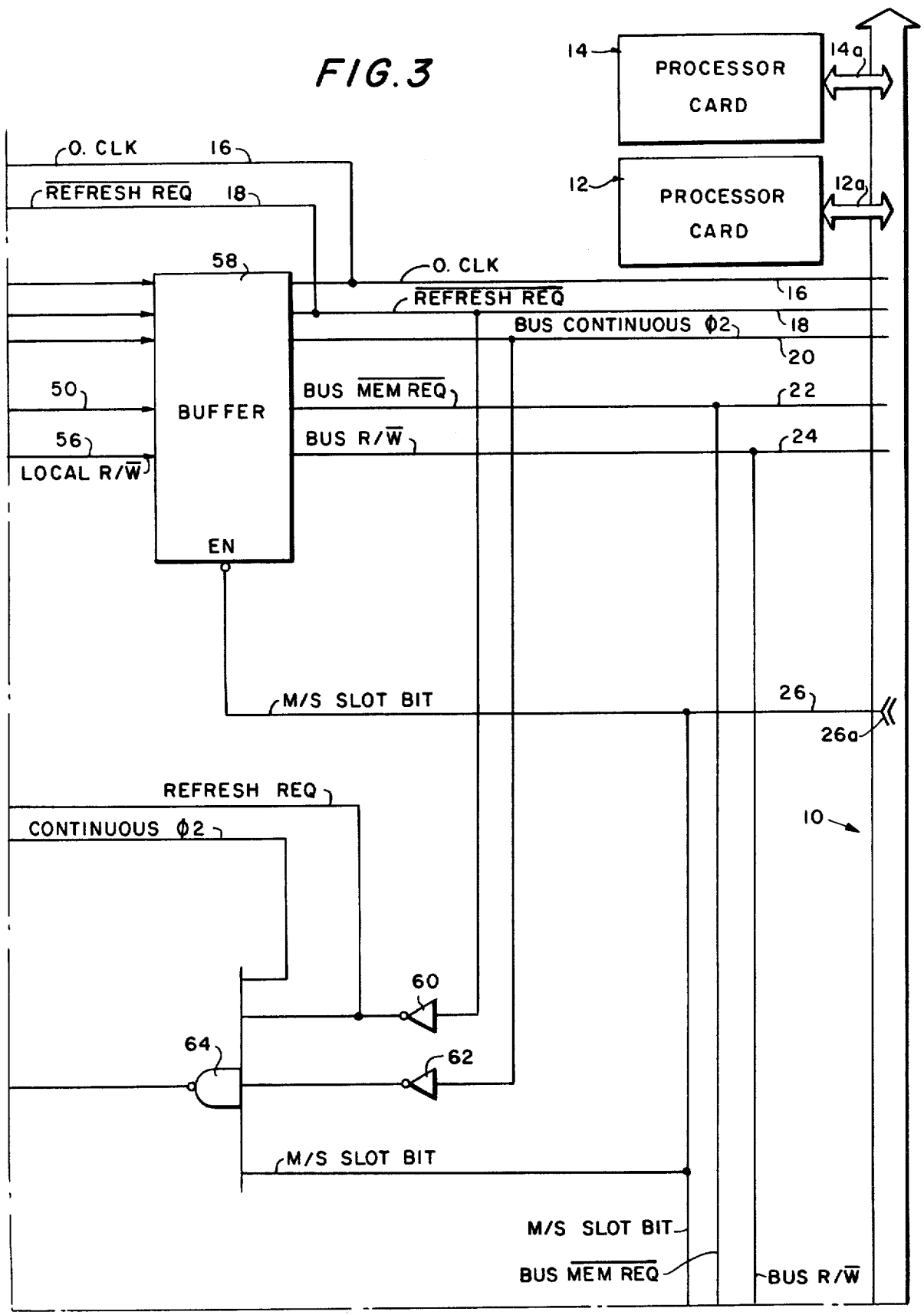
Figure 4:
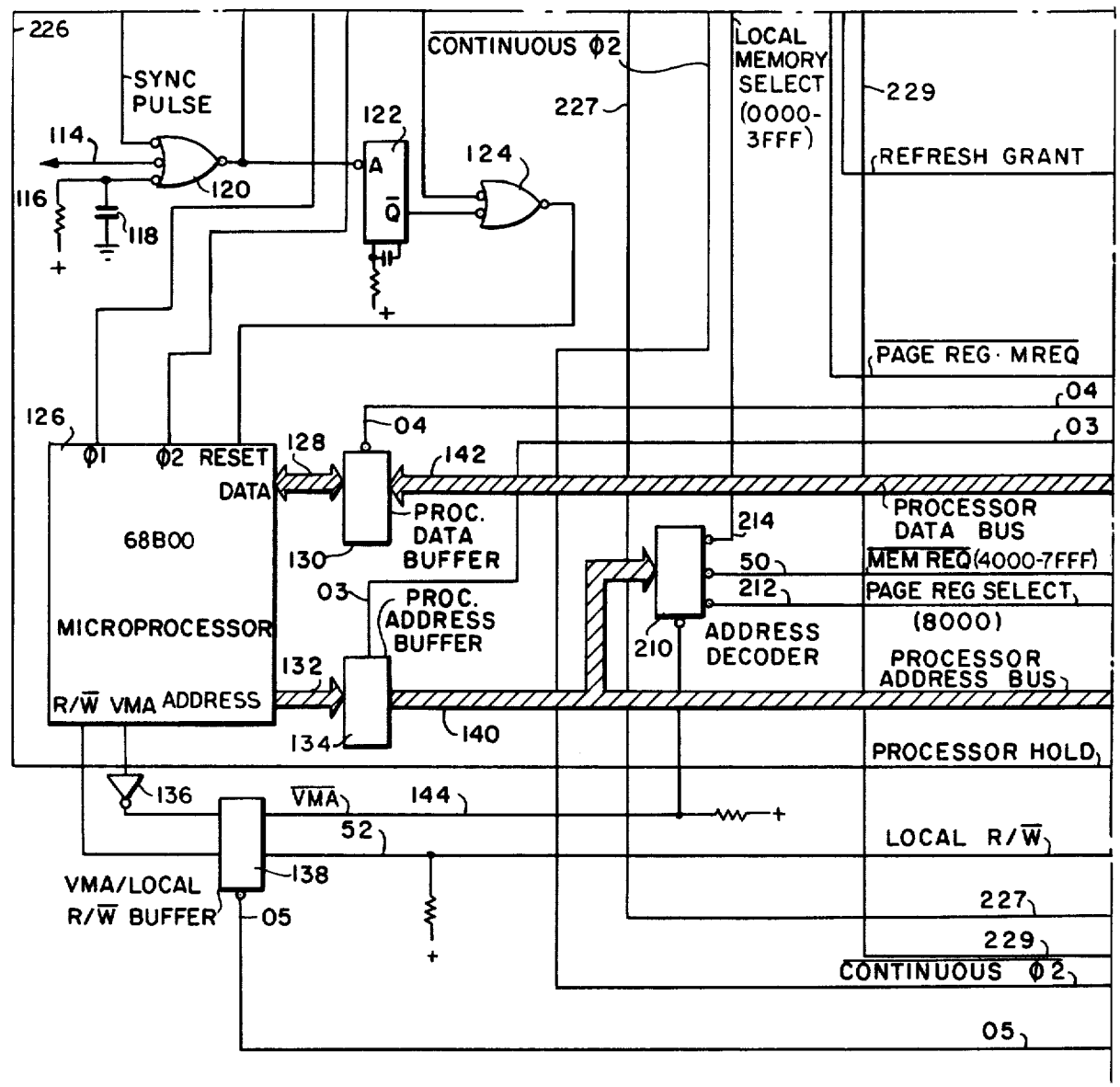
Figure 5:
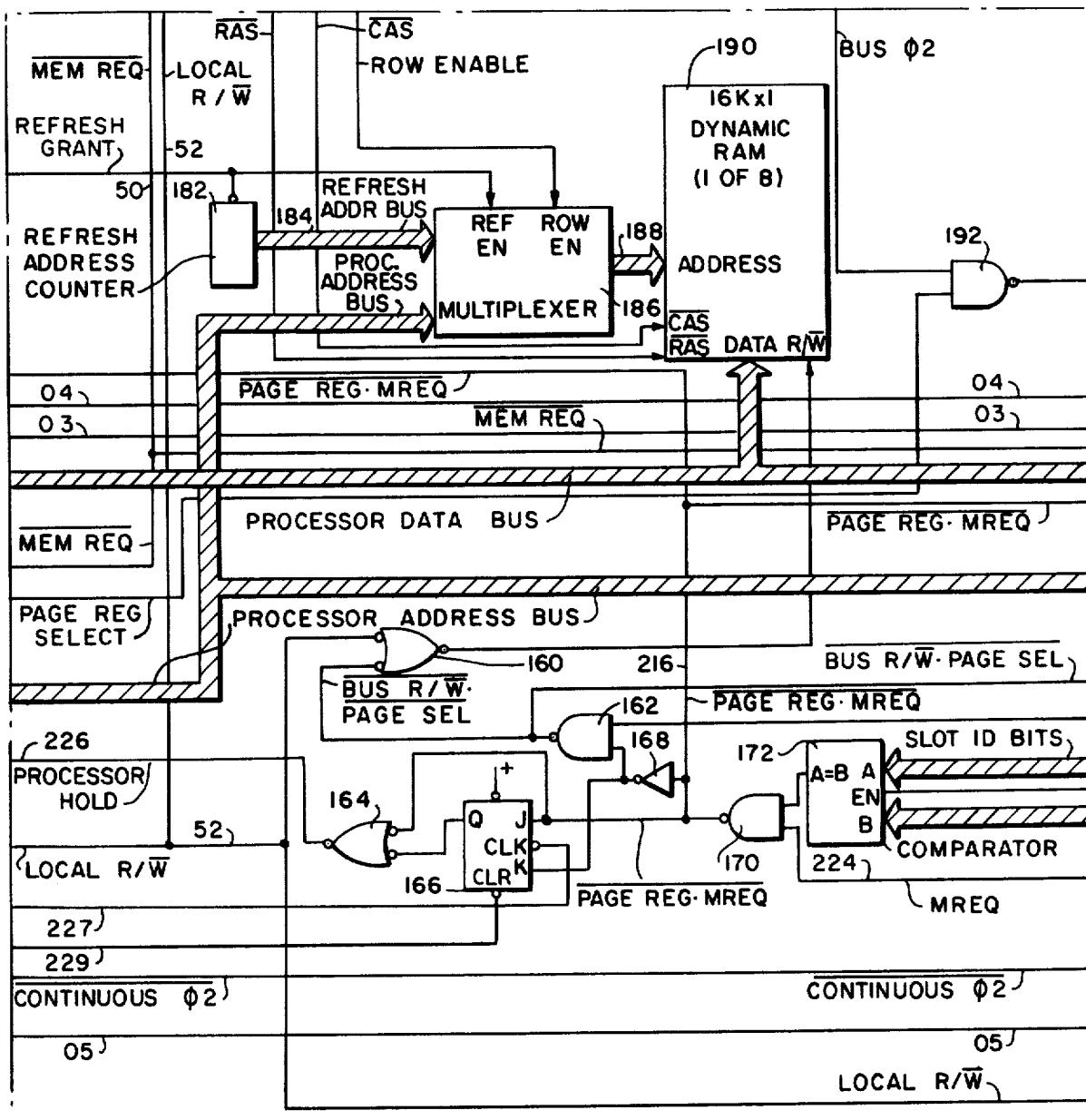

The drawing of FIGS. 1–6 illustrates an entire multiprocessor system. The backplane 10 is shown as being connected to three processor cards (it being understood that up to 17, one master and 16 slaves, can be included in the system). Two of the cards, 12 and 14, are simply shown as blocks connected over respective buses 12a and 14a to the backplane. The rest of the six-sheet drawing depicts the details of a single processor card. The bus connections for the two processor cards shown in block form are the same as those shown in detail for the other processor card. Each "processor" card includes both a processor and a memory.

Five control lines 16, 18, 20, 22 and 24 are connected over the common bus of backplane 10 to all of the processor cards. In the case of the master, five signals are transmitted over these lines to the bus, and all of the slaves are controlled by these signals. The five signals are as follows:

O.CLK—This is the master oscillator clock line, a 6-MHz signal.

REFRESH REQ—This signal goes low when logic on the master processor card determines that a refresh operation is required in all of the dynamic RAMs which comprise the master and slave memories.

BUS CONTINUOUS 02—This clock signal is the same as the 02 signal required for proper operation of 6800-series microprocessors, except that it is never suspended; because the signal is referenced to the 02 clock on the master card (which can be suspended), it is used by all of the slaves for synchronization purposes.

BUS MEM REQ—This signal goes low when the master desires access to a slave, in effect telling all of the slaves that one of them should suspend its operation during the current cycle; the particular slave which responds is selected as will be described below.

BUS R/$\overline{\text{W}}$—This signal is generated by the master to inform the selected slave whether a read or a write operation is required in the slave memory to be accessed by the master.

Each card is provided with a line 26 which is designated as the M/S slot bit. The numeral 26a indicates that the value of the slot bit is wired in the backplane. Unlike most of the lines which are connected in the backplane on the common bus, there is no M/S slot bit line which is extended to all cards. The backplane wiring determines which slot position contains the card which functions as the master. If the slot bit value is a 0, the connected card functions as the master; all of the other M/S slot bit lines are high, and the other processors function as slaves.

The page register bus 28 is a 4-bit wide bus connected to all of the cards. Before accessing a slave memory, the master places the 4-bit identification code of the slave card to be selected in page register 194. The 4-bit value is latched on each slave card as will be described below, and only one of the slave cards recognizes the page address. Only the processor on this card has its operation suspended when the master causes the BUS $\overline{\text{MEM}}$ $\overline{\text{REQ}}$ line 22 to go low.

Data bus 30 is an 8-bit wide bus over which data is transmitted from the master to be stored in a slave memory (when the BUS R/$\overline{\text{W}}$ line 24 is forced low by the master), or over which data is received by the master from a slave memory (when the BUS R/$\overline{\text{W}}$ line 24 is left high by the master).

Address bus 32 is 16 bits wide. The master always transmits a 16-bit address over this bus (only 14 bits of which are used, as described above). When the master is accessing its own memory, the address transmitted to all of the slaves is ignored because the BUS $\overline{\text{MEM}}$ $\overline{\text{REQ}}$ line 22 is high. But when the BUS $\overline{\text{MEM}}$ $\overline{\text{REQ}}$ line is low, to slave which recognizes its identification code on the page register bus allows the address on the address bus to be used to access the respective slave memory on behalf of the master.

The numeral 34 does not actually represent a true "bus", as the term is normally used. It simply represents four lines which serve as slot identification bits. These four lines are wired in the backplane, as represented by the numeral 34a, to a unique combination of 0 and 1 potential levels so that each slave card is provided with a unique address (depending on its slot position in the backplane). The four slot identification bits need not be wired at all for the master since, as will be described below, they are not used in the master; the master knows whether it is accessing its own memory or that of one of the slaves.

The M/S slot bit on line 26 in each card is extended to the enable input of buffer 58. The buffer is enabled, therefore, only on the master card. To cut down on costs, the buffer, as well as the gates connected to its several inputs, can be omitted on all of the slave cards since only the master generates the five signals on lines 16, 18, 20, 22 and 24; these lines are used on the slave cards only for detecting the received signals. Oscillator 40 generates the highest frequency signal used in the system, designated as 4×f$_0$ below. A 6-MHz master clock signal is extended through buffer 58 to all the slave cards.

When dynamic RAMs are used for memory, they must be refreshed periodically. As is known in the art, each memory is organized in rows and columns, and all of the cells in the same-numbered row on all of the memory chips are refreshed at the same time. Whenever the $\overline{\text{REFRESH REQ}}$ line 44 goes low in the master, the signal on line 18 of each card causes one row in all of the memory chips to be refreshed starting in the following cycle. As will be described below, the clock signal on line 46 in the master, designated CONTINUOUS 02, is a continuous signal which occurs at a rate of 1.5 MHz. This clock signal can therefore be used to determine the intervals at which refresh operations are necessary. Counter 42 counts the clock pulses and causes its output line 44 to go low for a single processor cycle approximately every 15 microseconds. Thus refresh operations occur at 15-microsecond intervals. This is at a fast enough rate to allow all of the memory cells to be refreshed without the loss of any data.

A CONTINUOUS 02 signal on line 46 is generated on every card. On the master card, the signal is extended through buffer 58 to line 20. The clock signal on line 20 is designated the BUS CONTINUOUS 02 clock signal because it is extended to all of the slaves and is used by them for synchronization purposes. Similarly, each processor generates a local R/$\overline{\text{W}}$ signal on line 52; this is the usual signal generated by a 6800-series microprocessor chip for designating whether a read or a write operation is to take place. Each processor card, including the master, uses the local R/$\overline{\text{W}}$ signal to control its own memory. It is only the master local R/$\overline{\text{W}}$ signal which is extended through buffer 58 to all of the slaves to control one of them when an access is made by the master. It should be noted that line 24 is labeled as the BUS R/$\overline{\text{W}}$ signal inasmuch as the local signal generated in the master is transmitted over the backplane to all of the slaves.

Of the five signals extended through buffer 58 on the master card, the last is the BUS $\overline{\text{MEM REQ}}$ signal. As described above, this signal is generated and transmitted only by the master card when access to a slave memory is required. Line 22 is labeled as BUS $\overline{\text{MEM REQ}}$ since the master-generated $\overline{\text{MEM REQ}}$ signal is extended over the backplane of all of the slave cards. A LOCAL MEMORY SELECT signal is also generated on each card, but for local use only.

Each of the cards includes a 6875 clock generator chip 76. The operation of this chip is well known to those skilled in the art and only a brief description of it will be given herein. The chip requires a continuous clock input, the O.CLK clock which cycles at a 6-MHz rate. The master clock signal is applied to the Ext In input of the chip. The two inputs x1, x2 which are used when a crystal is employed are connected as shown; the x1 input is left floating, and the x2 input is grounded.

The clock generator generates the two basic phase clock signals 01 and 02 which are required by a 6800-series microprocessor. (In the illustrative embodiment of the invention, the actual microprocessor 126 which is employed is a 68B00 chip.) It is during that 01 phase that an address is applied by the microprocessor to its address bus, and it is during the 02 phase that valid data is received from a memory or data which appears on the data bus is written into a memory. The two clock signals are non-overlapping, and each phase of operation occurs when the respective phase clock signal is high. The clock generator is also provided with a BUS 02 output whose signal is in phase with the 02 clock signal but has a different drive capability. (Although throughout this description references are made to the 01 and 02 clocks, the actual pin designations in Motorola literature are MPU 01 and MPU 02, and these are the designations employed in the drawing.) The clock generator also generates two continuous clock signals $2xf_0$ and $4xf_0$. The latter occurs at the rate of the master clock, and the former has a rate of half this value. The MEM CLK output of the clock generator is an output normally in phase with the 02 clock signal. (The MEM CLK output is sometimes referred to below by its full name—MEMORY CLOCK.)

When a refresh or DMA (the latter not being employed in the illustrative embodiment of the invention) access is required in a memory, the $\overline{\text{DMA/REF REQ}}$ input of the clock generator is forced low. When this happens, the 01 clock signal is frozen high, and the 02 clock signal is frozen low to allow dynamic memory refresh (or cycle steal DMA). However, the MEM CLK clock signal continues to run. The MEMORY READY input of the clock generator is caused to go low, usually by a slow memory which requires more time, in order to freeze the 01 clock signal low and the 02 clock signal high. (As will become apparent below, in the illustrative embodiment of the invention this input is used to freeze a slave processor when the master accesses the slave's respective memory.) Unlike the $\overline{\text{DMA/REF REQ}}$ input, when the MEMORY READY input is low, the MEM CLK output does not continue to run; instead, it is held high along with the 02 clock output. (The 6875 chip also includes a REF GRANT output which is usually used to synchronize refresh or DMA operation to the microprocessor, although this output is not used in the illustrative embodiment of the invention. In general, unused inputs or outputs of chips are not shown in the drawing, nor are pin connections—such as grounds and V+—generally shown for any of the chips when they are not required for an understanding of the system operation.)

The clock generator also includes a $\overline{\text{POWER ON RESET}}$ input which is forced low to initialize the system operation. When this input is forced low, the $\overline{\text{RESET OUTPUT}}$ pin is similarly forced low. During the reset of the clock generator, even while the $\overline{\text{POWER ON RESET}}$ input is held low, the various clocks start to cycle. While almost every system employing 6800-series chips includes a mechanism for delaying the start of processing until the reset operation is over, the generation of the clock signals begins sometime during the reset procedure. It is this feature of the 6800-series chips that gives rise to the synchronization problem in a multi-processor system. One of the objects of our invention is to have all of the processors operate in synchronism so that there is minimal suspension of slave processing when the master accesses a slave memory. But in order to accomplish this, it is necessary that the 01 and 02 clocks on all of the cards be synchronized.

CLOCK SYNCHRONIZATION

When power is first applied to the system, the voltage across capacitor 118 on each card cannot change instantaneously. Thus initially the lowermost input of gate 120 is low in potential and the output of the gate is low. The high-to-low transition at the input of one-shot multivibrator 122 causes its $\overline{Q}$ output to go low for 20 milliseconds. The low potential extended through gate 124, applied to the reset input of microprocessor 126, resets the microprocessor as is standard practice. The low potential at the output of gate 120 is also extended to the $\overline{\text{POWER ON RESET}}$ input of clock generator chip 76. Its $\overline{\text{RESET OUTPUT}}$ pin also goes low and serves as an alternate source for the reset of the microprocessor.

At any time during system operation that a reset of the entire system is required, a reset button on the front panel (not shown) may be operated to apply a ground to line 114 on each of the cards. The low signal at the second input of gate 120 causes its output to go low, and the system to be reset in the usual way. The third trigger mechanism, for resetting an individual card, occurs when SYNC PULSE line 70 is pulsed low on a particular card. The low signal on this line once again causes the output of gate 120 to go low and the microprocessor to be reset. However, it should be noted that the SYNC PULSE input is generated locally, so that it is only on a card whose line 70 goes low that a reset operation takes place. As will be described below, one of the inputs which controls the level of line 70 is the M/S slot bit whose value is wired in the backplane. Line 70 never goes low on the master card. But it can go low on a slave card if the slave clocks are out of synchronism with those of the master. The main reason for generating a SYNC PULSE on line 70 is so that it can control the operation of gate 74 on any slave card which is out of synchronism. When line 70 goes low, the output of gate 74 is held high. This does not occur on the master card where the master clock signal continues to be applied on the clock input of the 6875 clock generator chip. But it can occur on any out-of-synchronism slave card, and it is the vehicle for getting each slave to be synchronized to the master—both during initial synchronization and whenever, for one reason or another, the slave card loses synchronization.

The initial synchronization can require up to three steps on each card, with each step taking place when the master's logic generates a $\overline{\text{REFRESH REQ}}$ signal. Since refresh counter 42 generates these signals every 15 microseconds, the entire system is placed in synchronism long before the reset inputs to the microprocessors are allowed to go high (since one-shot multivibrator 122 on each card has a period of 20 milliseconds). Advantage is taken of the fact that the clock signals generated by a 6875 chip which is used for synchronization are not interrupted even though the processor is held reset.

The synchronization procedure can only be understood with reference to the relevant clock waveforms, and they are depicted in FIGS. 9A–9D. Waveforms (1)–(3) depict the master O.CLK clock signal, as well as the $2 \times f_0$ and 02 clock signals generated by the 6875 clock generator on the master card. The 02 signal generated by a 6875 clock chip always changes state on a high-to-low transition in the $2xf_0$ signal. It should be noted that waveform (3) is also said to be the BUS CONTINUOUS 02 signal inasmuch as the CONTINUOUS 02 signal on line 46 of the master card is in phase with the master 02 signal, and it is extended over line 20 to all of the slave cards. Because the 02 clock signal is not affected on the master card during initial synchronization (because the MEMORY READY input of clock generator 76 is never caused to go low on the master card), the master 02 clock signal is itself continuous (except during a refresh operation). As shown on FIG. 9A, a complete processor cycle takes place between successive falling edges of the 02 clock.

Waveforms (4) and (5) depict a "worst case" situation. It is assumed that in some slave, the $2xf_0$ signal (waveform (4)) is 180 degrees out of phase with the $2xf_0$ signal on the master card (waveform (2)), and that the sleeve 02 signal (waveform (5)) lags the master 02 signal (waveform (3)) by 90 degrees. All of the clocks continue to run until counter 42 on the master card generates a REFRESH REQ pulse. As described above, such a pulse occurs once every 15 microseconds. The refresh counter counts CONTINUOUS 02 pulses on line 46 in the master, and the manner in which these pulses are generated will become apparent below. For the moment, it should just be assumed that continuous pulses exist on line 46. Waveform (6) depicts the REFRESH REQ pulse generated by the master. The leading edge of the pulse occurs when the master CONTINUOUS 02 clock pulse goes high, counter 42 being advanced whenever a positive step appears at its input. The output of the counter remains a low until the next positive step appears at its input at which time another counting cycle begins. After an out-of-sync slave detects the REFRESH REQ signal from the master on its line 18, a step in the synchronization process takes place.

The BUS CONTINUOUS 02 signal on line 20 received by a slave is inverted by inverter 62 and applied to one input of gate 64. The inverted signal is shown in waveform (7) on FIG. 9A. The slave generates its own CONTINUOUS 02 signal on line 46 (also to be described below), and this signal is applied directly to a second input of gate 64. Waveform (8) is the same as waveform (5); as will become apparent below, the CONTINUOUS 02 signal generated on any card is in phase with the respective 02 signal. The third input to gate 64 is the REFRESH REQ signal on line 18 (waveform (6)), but it is inverted by inverter 60.

The fourth input to gate 64 is the M/S slot bit. In the case of a slave, this input is high in potential. The output of gate 64 is ordinarily high, and goes low only when all four inputs are high. Waveform (9), the output of the gate, is thus low only when waveform (6) is low (due to its inversion by inverter 60), and waveforms (7) and (8) are high. The output of the gate is applied to the D1 input of dual flip-flop 66.

The two flip-flops in chip 66 change state only when a positive step is applied to the CLK input. Gate 202 inverts the clock signal which appears at the output of Schmitt-trigger inverter 72. Thus disregarding inverters 204 and 206, dual flip-flop 66 is clocked whenever the O.CLK clock signal of waveform (1) goes high, the first such edge occurring right in the middle of the short negative pulse at the output of gate 64 (waveform (9)), and the second occurring shortly after the output of the gate resumes its normally high level. Because both of gates 204 and 206 are inverters, together they do not change the phase of the O.CLK signal which clocks the flip-flops. They are included in the circuit simply to introduce a short delay—to allow the output of gate 64 to go low before the flip-flops are clocked.

Waveform (10) depicts the $\overline{Q1}$ output of the first of the two flip-flops on chip 66. Since the $\overline{Q1}$ output follows the D1 input (but delayed by the clock pulse timing), the $\overline{Q1}$ output consists of a short positive pulse. The $\overline{Q1}$ output is fed to the D2 input, the input of the second flip-flop. The second flip-flop on chip 66 is clocked at the same time that the $\overline{Q1}$ output first goes high. When the clock pulse arrives, the $\overline{Q1}$ output is still low. Consequently, the D2 input is still low and the $\overline{Q2}$ output remains high. On the following clock pulse, the $\overline{Q2}$ output goes low inasmuch as the D2 input ($\overline{Q1}$ output) is now high at the start of the clock pulse. On the following clock pulse, the $\overline{Q2}$ output goes high once again.

The $\overline{Q1}$ and the $\overline{Q2}$ outputs of dual flip-flop 66 are extended to the inputs of gate 68. The output of the gate, waveform (12), is thus low only when its two inputs—waveforms (10) and (11)—are high. It is the short negative pulse at the output of gate 68, on SYNC PULSE line 70, that controls the first phase of the synchronization process.

It should be noted that on the master card the M/S slot bit input of gate 64 is low. Consequently, the output of gate 64 is always high, the $\overline{Q1}$ output of flip-flop 66 is always low, and the output of gate 68 is always high. It is for this reason that the clock inputs to the 6875 clock generator on the master card are not suspended during the synchronization process. It is only on a slave card that the various clock signals must be synchronized to those of the master.

Waveform (13) is the same as waveform (1) except that they are 180 degrees out of phase, waveform (13) depicting the clock pulses which appear at the output of inverter 72. Waveform (14) depicts the output of gate 74. With the output of gate 68 ordinarily high, gate 74 functions as an inverter so that it is readily O.CLK clock signal which is applied to the Ext In input of the clock generator. But on an out-of-sync slave, during the time that line 70 goes low, the output of gate 74 is held high.

Waveform (4) depicts the slave $2 \times f_0$ signal before the first synchronization step, and waveform (15) shows the same signal after the first synchronization step. The $2 \times f_0$ signal generated by the 6875 chip always changes state on a high-to-low transition at the Ext In input (output of gate 74). Consequently, it can be seen that the $2 \times f_0$ clock signal is stretched during the time that the output of gate 74 is held high. Waveform (16) is the same as waveform (2) and is repeated so that the $2 \times f_0$ clock signals in the master and the slave can be compared. As indicated on the drawing, prior to the stretching of the slave $2 \times f_0$ clock signal the two clock signals are out of phase, but after stretching they are in phase.

This does not solve the synchronization problem, however, because the 02 signals of the two clock generators are still out of phase. Each 02 signal changes state on a high-to-low transition of its respective $2 \times f_0$ signal. Waveform (18) is the same as waveform (3) because there is no change in the master 02 signal. But there is a phase change in the slave 02 signal, as shown in waveform (17). On each high-to-low transition of the slave $2 \times f_0$ signal (waveform (15)), there is a transition in the slave 02 signal. Consequently, the stretching of the slave $2 \times f_0$ signal for one O.CLK cycle results in the shifting of the slave 02 clock relative to the master 02 clock. Referring back to waveforms (3) and (5), it will be recalled that the master 02 signal was ahead of the slave 02 signal by 90 degrees. As seen in waveforms (17) and (18), after the first phase of the synchronization process the two 02 signals are 180 degrees out of phase.

It is during the next refresh cycle, which occurs 15 microseconds later, that the second step in the synchronization process takes place. Waveform (19) depicts another master REFRESH REQ pulse; as usual, the pulse begins when the master 02 clock goes high, and it lasts for one complete 02 cycle. As described above, the output of gate 64 is low only when the REFRESH REQ signal (waveform (19)) is low, the BUS CONTINUOUS 02 signal (waveform (18)) is low, and the slave CONTINUOUS 02 signal (waveform (17)) is high. On the second phase of the sychronization process the output of gate 64 goes low as shown in waveform (20).

Dual flip-flop 66 is clocked whenever the O.CLK clock signal goes high. The first such transition occurs one-half O.CLK clock cycle after the output of gate 64 goes low, and as shown in waveform (21) at this time the $\overline{Q1}$ output of flip-flop 66 goes high. The next positive clock edge occurs while the output of gate 64 is still low, so there is no change in the $\overline{Q1}$ output. It is only on the next O.CLK clock pulse that the $\overline{Q1}$ output goes low. The second flip-flop on chip 66 changes state on the second of these clock pulses, with the $\overline{Q2}$ output going low. The next clock pulse has no effect on the Q2 output because when the clock input goes high, the $\overline{Q1}$ output is still high. But on the next clock pulse the $\overline{Q2}$ output goes high once again.

The output of gate 68 is low only when the $\overline{Q1}$ and $\overline{Q2}$ outputs of flip-flop 66 are high. As shown in waveform (23), the output of gate 68 goes low for one complete O.CLK clock cycle.

As described above, the output of gate 74 is high whenever the O.CLK clock signal is high, but is also high whenever the output of gate 68 is low. This results in the stretching of the output gate 74 as shown in waveform (24). Since transitions in the $2 \times f_0$ clock signal of the slave 6875 chip occur only on high-to-low transitions in the output of gate 74, it is apparent that the slave $2 \times f_0$ clock signal is stretched as shown in waveform (25). Because the 02 signal changes state only on a high-to-low transition in the $2 \times f_0$ clock signal, it is apparent that there is a stretching of the slave 02 signal as shown in waveform (26). Waveform (27) is the same as waveform (18) and shows the master (and BUS CONTINUOUS) 02 signal. It will be noted from a comparison of waveforms (26) and (27) that while the 02 signals are 180 degrees out of phase before the output of gate 68 goes low, following operation of the gate the slave 02 signal leads the master 02 signal by only 90 degrees.

It is during the third phase of the synchronization process that the two 02 clock signals are brought into synchronization. Waveform (28) depicts the slave 02 signal after the second correction. It will be noted that the phase of waveform (28) is shifted 90 degrees relative to that of waveform (26) as a result of the second correction. Waveform (29) shows the third $\overline{REFRESH}$ $\overline{REQ}$ pulse which, as usual, occurs on a low-to-high transition in the master 02 signal (waveform 27)). Utilizing the same type of analysis described twice above, one arrives at waveforms (30) through (33) respectively for the output of gate 64, the $\overline{Q1}$ and $\overline{Q2}$ outputs of chip 66, and the output of gate 68.

Waveform (34) shows how the O.CLK signal which normally appears at the output of gate 74 is held high during the time that the output of gate 68 is low. Waveform (35) depicts how this stretching suspends the $2 \times f_0$ slave clock signal, inasmuch as there is a transition in this clock signal only when the output of gate 74 exhibits a high-to-low transition.

Waveform (36) depicts the slave 02 signal after the third correction. Because the 02 signal outputted by the clock generator exhibits a transition only when the $2 \times f_0$ signal exhibits a high-to-low transition, it is apparent that the slave 02 signal is also stretched. Finally, waveform (37) simply repeats the master 02 and BUS CONTINUOUS 02 clock signal which has been the reference all along. It is apparent that following the third correction and the stretching of the slave 02 signal, the two 02 signals are in synchronism.

This completes the description of the synchronization process. The worst case is that which requires three refresh cycles, the case depicted in waveforms (1)–(37). If a particular slave processor clock generator starts to cycle such that the slave 02 and master 02 clocks have the relative phases depicted in waveforms (17) and (18), then it will require only two corrections in order to bring them into step. Similarly, if a slave clock generator starts to cycle such that is 02 signal and the master 02 signal have the relative phases depicted in waveforms (27) and (28), then only a single correction cycle will be required. But in all cases, long before the reset pulses to the clock generators and the microprocessors have terminated, the slave clock generators will be in synchronism with the master clock generator. Furthermore, should the clock generator on any slave ever fall out of synchronism, the low-level pulses on line 70 will not only control resetting of the slave microprocessor, but also bring the slave clock generator into synchronism with the master clock generator.

PROCESSOR AND MEMORY TIMING

At this point, it will helpful to consider the basic processor and memory timing, both during normal access by any processor to its respective memory and during an overall system refresh cycle. The waveforms involved will also make clear how the CONTINUOUS 02 signal is generated on each card. The more complicated case of the master accessing one of the slave memories will be described after the basic timing is first considered.

On FIG. 10, waveform (1) is the master O.CLK clock signal, and waveform (2) depicts the $2 \times f_0$ clock signal generated by the 6875 clock generator chip; all transitions in the latter signal occur on falling edges of the O.CLK master clock. Waveform (3) depicts the standard MEMORY CLOCK signal of the 6875 chip, which is in phase with the 02 clock signal of waveform (4). The clock generator also generates the 01 clock signal of waveform (5) which is out of phase with the 02 signal.

Flip-flop 78 on every card generates the respective CONTINUOUS 02 signal. Becase the $2 \times f_0$ signal is applied to the CLK input of the JK flip-flop, the flip-flop can change state on each falling edge of waveform (2), at times $t_1$, $t_2$, etc. indicated in the drawing. The MEMORY CLOCK signal is applied to the J input of the flip-flop and the K input is tied to a positive potential. Although there is a transition in the MEMORY CLOCK signal at each of times $t_1$, $t_2$, etc., the JK flip-flop responds to the level at its J input just prior to the transition. At time $t_1$, just prior to which the MEMORY CLOCK signal is high, both inputs to the flip-flop are high and the flip-flop therefore changes state. As shown in waveform (6), since the $\overline{Q}$ output was initially high, it now goes low. Just prior to time $t_2$, the memory clock signal is low; with a low-level potential at the J input and a high-level potential at the K input, the flip-flop is reset with the $\overline{Q}$ output going high. The flip-flop operation at time $t_3$ is the same as that at time $t_1$, the operation at time $t_4$ is the same as that at time $t_2$, etc. It is thus apparent that in the absence of the MEMORY READY or DMA/REF REQ inputs going low, the CONTINUOUS 02 signal on each card is in phase with the clock generator 02 signal (waveforms (4) and (6)), even though the CONTINUOUS 02 signal is not actually derived from the 02 signal.

As shown in FIG. 10, a complete processor cycle takes place between two successive falling edges of the 02 clock. The 01 and 02 signals are applied to respective inputs of microprocessor 126. Waveform (7) depicts the time during each cycle that the microprocessor applies address bits to its address bus. It is during the application of the address bits to the bus that the VMA output of the microprocessor goes high to indicate that an address has been generated. Waveform (8) depicts the timing of the R/W signal which is generated by the microprocessor to indicate whether a read or a write operation is to take place. In the case of a write operation, data is applied by the processor to the 8-bit data bus during the interval indicated in waveform (9). In the case of a read operation, data from the memory (or I/O device) is expected to appear on the data bus during the interval indicated in waveform (10).

Before considering the basic memory timing, it will be helpful to consider the memory itself and its associated multiplexer. The memory on each card consists of eight chips connected in parallel, only one of which is shown. Each chip is a 16Kx1 device. All of the address and control lines are connected in parallel to each of the eight chips, but the single data bit pin on each chip is connected to a respective one of the eight bit lines on the data bus. In order to access one of 16K memory cells, 14 bits are required. The memory is organized in the form of $2^7$ rows and $2^7$ columns. There is first applied to the chip a 7-bit address representing the selected row, the seven low-order bits in the 14-bit address. The row address bits are strobed into the chip when the $\overline{RAS}$ input goes low. Next, the seven column address bits (the seven most significant bits in the 14-bit address) are applied to the seven address inputs of the chip, and they are strobed when the $\overline{CAS}$ input goes low. The memory performs a read or write operation depending upon the state of the R/W input, and either writes a bit value in accordance with the value on the respective data bit input, or reads out a bit value and applies it to this line. In the event the $\overline{RAS}$ input is strobed without a following strobe of the $\overline{CAS}$ input, the $\overline{RAM}$ simply refreshes all $2^7$ cells in the row identified by the seven row address bits. (The additional inputs required to the memory are not shown since they are not required for an understanding of the present invention.)

There must therefore be two sources of address bits. A 14-bit address for a read/write operation appears on bus 140. On the master card, the address can be derived only from the master processor, and on a slave card it can be derived from either the slave processor or from the master processor, as will be described below. But in either case, the 14-bit address appears at 14 inputs of multiplexer 186. (Because of the numerous inputs, four multiplexers operated in parallel are actually used in the illustrative embodiment of the invention.) A 7-bit refresh address appears on bus 184 and is applied to another seven inputs of the multiplexer. The refresh address is derived from refresh address counter 182.

In the master processor, refresh counter 42 generates $\overline{REFRESH\ REQ}$ pulses once very 15 microseconds. The pulse which appears at the output of buffer 58 on the master is applied directly to the J input of flip-flop 80 on the master card. It is also transmitted over line 18 to the backplane bus from which it is applied to line 18 on each slave card and similarly appears at the J input of flip-flop 80 on each slave. On every card, the $\overline{REFRESH\ REQ}$ signal is extended from line 18 to inverter 60, with the output of the inverter being applied to the K input of the respective flip-flop 80. The flip-flop is clocked by the falling edge of the CONTINUOUS 02 signal on line 46 of each card. Most of the time, the output of refresh counter 40 on the master card is high. Thus the J input of flip-flop 80 on all cards is usually high and the K input is usually low. During a refresh operation, the flip-flop on each card has its Q output low. But as soon as the output of counter 42 goes high, the next clocking of the flip-flop causes the Q output to go high and the $\overline{Q}$ output to go low. The refresh counter is clocked by a rising edge of the CONTINUOUS 02 signal on the master card. Thus the $\overline{REFRESH\ REQ}$ lines in all processors go low at a time when flip-flop 80 on each card is not clocked. (It should be recalled that the CONTINUOUS 02 signals on all cards are in synchronism.) But as soon as the CONTINUOUS 02 clocks go low, the Q output of flip-flop 80 on each card goes low and the $\overline{Q}$ output goes high. The $\overline{REFRESH\ REQ}$ signal goes high once again on the next rising edge of the CONTINUOUS 02 clock in the master, and thus it is on the next falling edge of all CONTINUOUS 02 clocks that all of the flip-flops are restored to their normal states. It is thus apparent that for one complete processor cycle, when a refresh operation is required on all cards, the REFRESH GRANT line 84 goes low and the REFRESH GRANT line 82 goes high.

The refresh address counter on each card is clocked by the falling edge of the REFRESH GRANT pulse, at the end of each refresh cycle. The refresh counter is thus advanced long prior to the next refresh cycle and its address bus 184 is stable at the start of each refresh cycle.

In the case of an ordinary read/write cycle, the REFRESH GRANT line remains low. This line is applied to the REF EN input of the multiplexer. When this input is held low, the seven refresh address bits are not extended through the multiplexer. Instead, 7 of the 14 processor address bits are extended through the multiplexer to the 7-bit bus 188. Which of the address bits are thus extended through the multiplexer depends on the state of the ROW EN input of the multiplexer. When the ROW EN input is low, the 7 least significant (row) address bits are extended to the memory, and when the ROW EN input is high the 7 most significant (column) bits are extended to the memory. During a refresh operation, when the REFRESH GRANT line goes high, the state of the ROW EN input is irrelevant; the high potential at the REF EN input of the multiplexer causes the 7 refresh address bits to be extended to the memory for the entire refresh cycle.

FIG. 11 depicts the memory timing during an ordinary read/write cycle. The timing applies to both the master and slave cards. (In the case of a master access of a slave memory, the address on bus 140 is derived from the master card rather than the local processor, and the data and R/W lines of the slave memory are connected over the backplane to the master processor rather than to the local processor, but the memory timing signals are the same no matter which processor is performing an access.) Waveforms (1), (2) and (3) simply depict the O.CLK, $2 \times f_0$ and CONTINUOUS 02 signals on the card whose memory is to be accessed. It should be noted that the CONTINUOUS 02 signal is also designated as the RAS (ROW ADDRESS STROBE) signal since it is used to strobe in the seven row address bits to the memory. The signal is derived from the CONTINUOUS 02 signal on line 46 which is applied to one input of gate 94. The other input is connected to the output of gate 112. The RAS line 96 thus goes low only when the CONTINUOUS 02 signal is high and the output of gate 112 is high. The output of gate 112 goes high when any one of its inputs goes low. A first input is connected to the $\overline{REFRESH\ GRANT}$ line 82, which line goes low during a refresh cycle; a 7-bit row address must still be strobed into the memory during a refresh cycle, and it is necessary to generate the $\overline{\text{RAS}}$ signal. A second input of gate 112 is derived from an output of address decoder 210. Any memory may be accessed by its own processor by specifying an address in the range 0000–3FFF. If such an address appears on the address bus 140, it is detected by decoder 210, and the decoder causes its LOCAL MEMORY SELECT (0000–3FFF) line 214 to go low for as long as the address remains on the bus. Consequently, because the address appears on the bus when the 02 signal is high, the second input of gate 112 is caused to go low so that the $\overline{\text{RAS}}$ signal can be generated as required.

The third input of gate 112 is derived from the output of gate 170. As will be described below, the output of this gate goes low only on a slave card when the slave recognizes that the master desires access to the slave's memory (with the BUS $\overline{\text{MEM REQ}}$ line 22 going low, and the page address appearing on bus 28 from the master matching the slave's own slot ID bits). In such a case, the output of gate 170 goes low on the slave card, this output being extended over $\overline{\text{PAGE REG·MREQ}}$ line 216 to the third input of gate 112. Since the slave which has recognized its page address must allow access to its memory by the master, the $\overline{\text{RAS}}$ strobe must still be generated. It should be noted that the three inputs to gate 112 control generation of the $\overline{\text{RAS}}$ strobe for the three possible types of memory access—refresh, processor access of its own memory, and master processor access of a slave memory.

Waveform (4) on FIG. 11 depicts the CAS (COLUMN ADDRESS STROBE) signal which appears at the Q1 output of flip-flops 86 and is a source for the $\overline{\text{CAS}}$ signal which clocks a 7-bit column address into the memory in the case of a read/write operation. The $\overline{\text{CAS}}$ signal is also controlled by the Q3 output of chip 86. All three flip-flops on this chip are clocked by the $4 \times f_0$ clock signal which is the same as the O.CLK clock of waveform (1). The flip-flops thus change state whenever the O.CLK clock exhibits a low-to-high transition. The CONTINUOUS 02 clock is applied to D1 input. Thus on the first positive edge of the O.CLK waveform during a processor cycle, the Q1 output of chip 86 goes low as shown in waveform (4) because the CONTINUOUS 02 signal is low. The Q1 output goes high again only on the first rising edge of the O.CLK waveform which occurs after the CONTINUOUS 02 signal has gone high, as shown in waveform (4). During an ordinary read/write access, the $\overline{\text{REFRESH GRANT}}$ line 84 is high. Because this line is connected to the D2 input of chip 86, the Q2 output remains high. Because the Q2 output is connected to the D3 input, the Q3 output, the CAS INHIBIT, also remains high. Consequently, both inputs to gate 88 are high and the $\overline{\text{CAS}}$ signal on line 90 is inverse of the $\overline{\text{CAS}}$ signal shown in waveform (4).

It should be noted that in the case of a refresh operation, the $\overline{\text{CAS}}$ line must remain high; there is no column strobe. Even though the CAS input to gate 88 goes low as shown in waveform (4), it is the Q3 (CAS INHIBIT) output of chip 86 which is held low during a refresh cycle in order to hold the CAS output hgh, as will be described below.

The CONTINUOUS 02 signal on line 46 is simply extended through gate 92 to ROW ENABLE line 98. The gate introduces a short delay and, as shown in waveform (5), the ROW ENABLE signal is delayed slightly relative to the ROW ADDRESS STROBE signal. The REFRESH GRANT line is held low throughout the read/write cycle, as shown in waveform (6) and as described above, in order to allow the 14-bit processor address to be extended through the multiplexer in two steps, the two steps being controlled by the ROW ENABLE signal.

Waveform (7) shows the time during which the 14-bit processor address appears on the 14-bit input of bus multiplexer 186. While the ROW ENABLE signal is low, the low level at the ROW EN input of the multiplexer causes the seven least significant bits of the processor address to be extended through the multiplexer to bus 188. These are the row address bits as shown in waveform (8). But as soon as the ROW ENABLE signal goes high, the high level input at the ROW EN input of the multiplexer causes the seven column address bits to be extended through the multiplexer, also as shown in waveform (8). Underneath waveform (8) two arrows are shown. The first corresponds to the RAS signal (waveform (3)) going high. When the RAS signal goes high, the $\overline{\text{RAS}}$ signal goes low, and as described above a row address is strobed into the memory. The second arrow is shown in line with the CAS signal going high. When the CAS signal goes high, the $\overline{\text{CAS}}$ input of the memory goes low, and the column address bits are strobed into the memory. The memory then performs a read or a write operation in accordance with the R/$\overline{\text{W}}$ signal input. It should be noted that the reason for delaying the ROW ENABLE signal by the use of gate 92 is to insure that the row address bits remain on bus 188 when the $\overline{\text{RAS}}$ signal goes low. Without this delay, the address bits on bus 188 would change at the same time that the $\overline{\text{RAS}}$ input is strobed. By delaying the ROW ENABLE signal slightly, the row address bits are strobed into the memory, and only after the strobe do the column address bits replace the row address bits on the bus. The delay which gate 92 introduces is approximately 20 nanoseconds.

FIG. 12 depicts the processor timing during a refresh cycle. Waveforms (1), (2) and (3) simply depict the basic O.CLK, $2 \times f_0$, and CONTINUOUS 02 signals on all processor cards. Waveforms (4) and (5) depict the 01 and 02 signals in the absence of refresh requests.

When a refresh operation is required, the $\overline{\text{REFRESH REQ}}$ signal goes low on the rising edge of the CONTINUOUS 02 clock on the master card, as described above. This actually takes place in the middle of a processor cycle, and the $\overline{\text{REFRESH REQ}}$ line remains low until the middle of the next processor cycle when the master CONTINUOUS 02 signal next goes high, as depicted in waveform (6).

Flip-flop 80 is clocked on each card on the falling edge of the respective CONTINUOUS 02 signal. Thus it is only in the middle of the $\overline{\text{REFRESH REQ}}$ pulse that flip-flop 80 is clocked—at the start of a processor cycle—at which time the REFRESH GRANT line (Q output of the flip-flop) goes high to control multiplexer 186 to extend a row refresh address to the memory. Flip-flop 80 is restored to its normal condition at the end of the cycle when the CONTINUOUS 02 signal goes low again, by which time the REFRESH REQ input is high once again. Consequently, the REFRESH GRANT signal of waveform (7), which controls a refresh cycle, remains high for one complete processor cycle.

For a refresh operation to take place, the processor on each card must stop cycling, with its 01 input remaining high and its 02 input remaining low. It will be noted that the $\overline{\text{REFRESH REQ}}$ line 18 on each card is extended to the $\overline{\text{DMA/REF REQ}}$ input of the respective 6875 clock generator. The clock generator samples this input on the rising edge of the $2 \times f_0$ clock, but it does not actually stop cycling the 01 and 02 clocks until the falling edge of the $2 \times f_0$ signal. The first rising edge of the $2 \times f_0$ clock which occurs after the $\overline{\text{DMA/REF REQ}}$ input of the clock generator first goes low is that labelled $t_1$ in waveform (2). On the following falling edge of the $2 \times f_0$ clock, at time $t_2$, the clock generator causes the 02 signal to go low and to remain low. On the next positive edge of the $2 \times f_0$ clock, at time $t_3$, the $\overline{\text{DMA/REF REQ}}$ input of the clock generator is still low, so there is no change in the states of the 01 and 02 clocks at time $t_4$. But by time $t_5$ the $\overline{\text{REFRESH REQ}}$ signal has gone high, and the $\overline{\text{DMA/REF REQ}}$ input of the clock generator is now high. Consequently, at time $t_6$, on a falling edge of the $2 \times f_0$ clock, the clock generator cycling of the 01 and 02 clocks resumes. It resumes from where it left off, with the 02 signal having just gone low and the 01 clock having just gone high; there follows ordinary cycling starting at time $t_6$. This is as it should be since the refresh cycle is over, and a new processor cycle is allowed to begin—with the 01 clock high and the 02 clock low. In effect, each of the 01 and 02 clocks are stretched for one complete processor cycle to allow refreshing of the memories.

Figure 13:
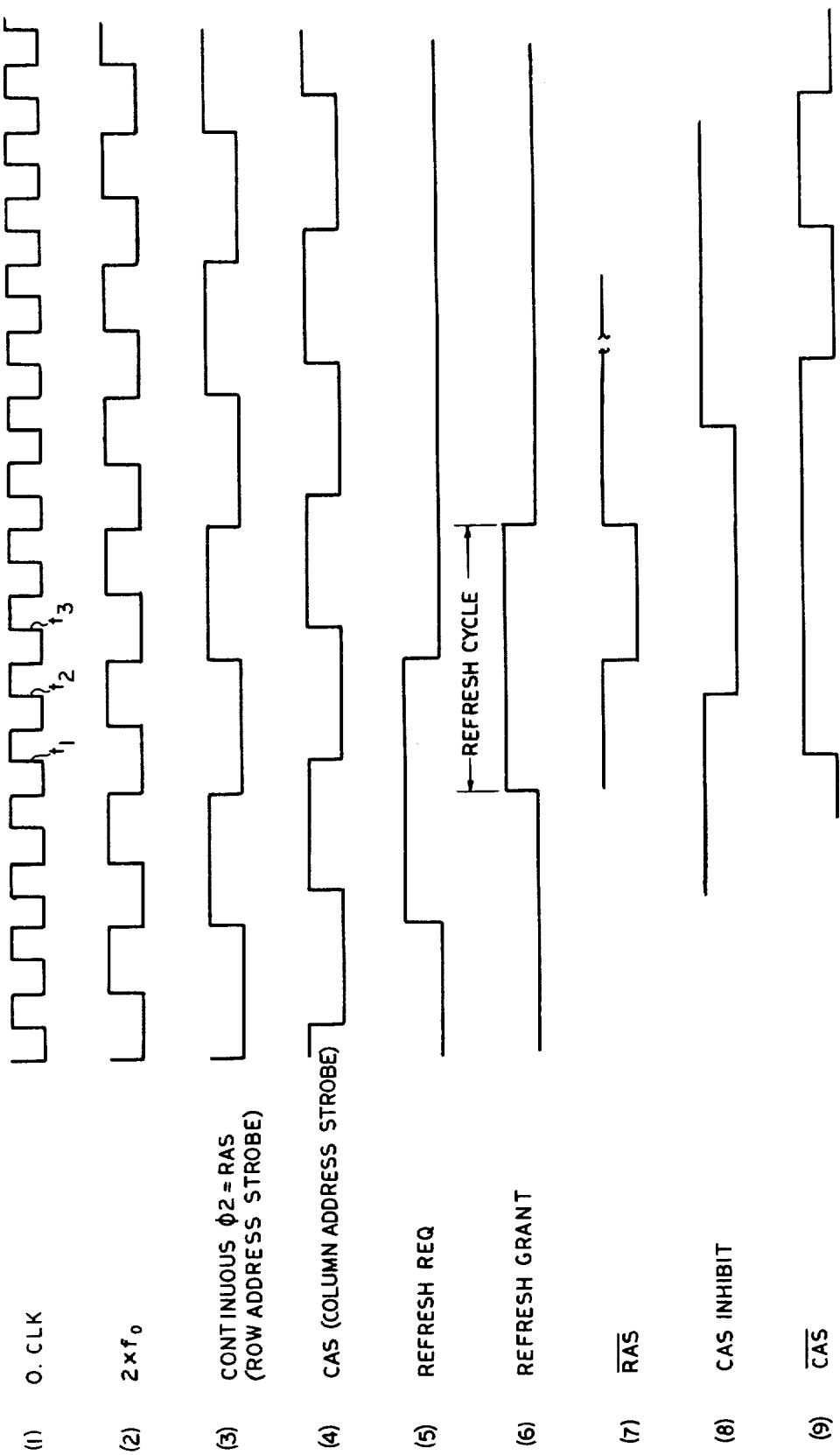

The memory timing during a refresh cycle is more complicated than it is during a read/write cycle. The relevant waveforms are shown in FIG. 13. Waveforms (1), (2) and (3) are the same as the same-numbered waveforms on FIG. 11 and depict the basic timing signals—O.CLK, $2 \times f_0$ and CONTINUOUS 02 (ROW ADDRESS STROBE). Similarly, waveform (4) is the same on each figure, and depicts the CAS (COLUMN ADDRESS STROBE) signal. Referring to FIG. 11, it will be recalled that it is when the CAS signal goes high in the second half of the cycle that the CAS input of the memory is strobed to store a column address in the memory. During a refresh cycle, the CAS strobe must be inhibited so that an entire row is refreshed. This is controlled by the second and third flip-flops on chip 86.

Waveform (5) on FIG. 13 simply depicts the usual $\overline{\text{REFRESH REQ}}$ signal which occurs from the middle of one processor cycle to the middle of another, and waveform (6) depicts the REFRESH GRANT signal which, as described above, is high for one processor cycle during which a refresh operation takes place. Waveform (7) depicts the $\overline{\text{RAS}}$ signal which is simply the inverse of waveform (3) when a memory is being accessed or refreshed; in the middle of the cycle, as seen by the left arrow adjacent waveform (8) in FIG. 11, the row address is strobed into the memory. (Because the REFRESH GRANT line is now high and the REF EN input of the multiplexer is enabled, it is the refresh address on bus 184 that is extended through the multiplexer to the memory.)

The $\overline{\text{REFRESH GRANT}}$ line 84 is connected to the D2 input on chip 86. Because the flip-flops on chip 86 are clocked by the $4 \times f_0$ signal which is the same as the O.CLK waveform of waveform (1), the flip-flops in chip 86 change state only on a rising edge of the O.CLK waveform. On the first rising edge during a refresh cycle, at time $t_1$ on waveform (1) of FIG. 13, the Q2 output of chip 86 goes low. Because this output is connected to the D3 input, on the next rising edge of the O.CLK waveform, at time $t_2$, the Q3 output goes low. This output is the CAS INHIBIT input of gate 88.

Referring back to waveform (4) of FIG. 11, it will be noted that on the first rising edge of the O.CLK waveform during any cycle, the CAS input to gate 88 goes low. The same is true during a refresh cycle, and this is shown in waveform (9) of FIG. 13, with the $\overline{\text{CAS}}$ signal going high at time $t_1$. But because the CAS INHIBIT signal goes low at time $t_2$, the $\overline{\text{CAS}}$ output remains high throughout the cycle, even though the CAS input goes high at time $t_3$. The $\overline{\text{CAS}}$ signal remains high so that there is no column address strobe to the memories following a row address strobe. The memories recognize the absence of the column address strobe and perform a refresh operation.

At the end of the cycle the CAS signal cycles just as it does during a read/write sequence. But during the next cycle, the REFRESH GRANT line is low. Just as the second and third flip-flops on chip 86 delayed the CAS INHIBIT signal from following the $\overline{\text{REFRESH GRANT}}$ input for 1.5 cycles of the O.CLK waveform at the start of the refresh cycle, they similarly delay the CAS INHIBIT signal from following the new state of the $\overline{\text{REFRESH GRANT}}$ signal at the start of the next cycle. Thus the CAS INHIBIT signal of waveform (8) is shown going high 1.5 O.CLK clock cycles into the next processor cycle. At this time, the CAS input to gate 88, waveform (4), is still low, so that the $\overline{\text{CAS}}$ output remains high. But when the CAS input next goes high, the $\overline{\text{CAS}}$ output goes low. This is precisely when it should go low for a column address strobe to take place. (See waveform (4) on FIG. 11 which depicts the CAS signal going high at the same time during a read/write cycle that the $\overline{\text{CAS}}$ signal of waveform (9) in FIG. 13 goes low.)

When the master accesses its own memory, the timing is as described above. Even when it accesses a slave memory, there is no need to suspend the usual cycling of the 6875 clock generator on the master card. The master is simply accessing one memory instead of another, and insofar as the master processor and the master clock generator are concerned, they can cycle in the usual way. It is for this reason that the MEMORY READY input of the clock generator on the master card is never made to go low; there is no need to suspend processor operation by stretching the 01 and 02 clocks. (It will be recalled that when the MEMORY READY input of the clock generator goes low, the 01 output of the clock generator is frozen low and the 02 output is frozen high, and the MEM CLK output is similarly held high.) It is only on a slave card that the MEMORY READY input of the respective clock generator should go low when the slave memory is being accessed by the master. This is necessary in order to suspend operation of the respective slave processor.

When the master desires to access a slave memory, it must first set the page register 194 on the master card with the slave card identity. During an ordinary master processor write cycle, the address 8000 is applied to the address bus. Decoder 210 recognizes this address and applies a low-level signal to its $\overline{\text{PAGE REG SELECT}}$ (8000) line 212. This signal is extended to one input of gate 192. The BUS 02 output of the master clock generator, which is in phase with the 02 signal, is extended to the second input of gate 192. Thus in the middle of the cycle when the 02 clock goes high, the output of gate 192 goes low. At the end of the 02 clock pulse, the output of gate 192 goes high and clocks in data in page register 194. During the write cycle, the master processor outputs a code representing the identity of the slave memory to be accessed on the four least significant bits of the data bus 128. These bits are extended over the master processor data bus 142 to the four inputs of page register 194 and they are clocked into the register. These bits appear on page register bus 28, the four lines of which are extended to all of the slave cards. It is only necessary to set the page register once for multiple accesses to a particular slave memory since page register bits remain on the page register bus after they are first clocked in the page register. On each slave card, the bits appearing on bus 28 are applied to the four inputs of latch 174.

When the master processor desires to access a slave memory, as described above it applies an address in the range 4000–7FFF to its address bus. When decoder 210 recognizes an address in this range, it applies a low-level signal to its $\overline{\text{MEM REQ}}$ (4000–7FFF) line 50. This signal is extended through buffer 58 to line 22 which is extended to all of the slaves. The signal is inverted by inverter 176 in each slave and a positive potential is then applied to another of the inputs of latch 174. The master also extends its R/$\overline{\text{W}}$ output through buffer 138 (as will be described below) and buffer 58 to BUS R/$\overline{\text{W}}$ line 24 which is extended to all of the slaves. On each slave card, this signal is inverted by inverter 178 and applied to the sixth input of latch 174.

On each card, the Q output of flip-flop 78 is applied to the enable input of latch 174. The Q output of the flip-flop is simply the inverse of the CONTINUOUS 02 signal. At the start of each cycle, the $\overline{\text{CONTINUOUS}}$ $\overline{\text{02}}$ signal goes high, and inputs to latch 174 are allowed to pass through it. It is in the middle of the cycle, when the $\overline{\text{CONTINUOUS Q2}}$ signal goes low, that the six bits appearing at the inputs of the latch remain stored in it, with the latch contents not being changed during the last half of the cycle.

FIGS. 14A–14B depict the timing when the master processor accesses a slave memory. Waveform (1) depicts the O.CLK master clock signal which appears on all cards, and waveform (2) depicts the $2 \times f_0$ signals which are also all the same due to the synchronism of the clock generators on all cards. Waveform (3) depicts the BUS CONTINUOUS 02 signal (which is the same as the master 02 clock).

Waveform (5) depicts the $\overline{\text{MEM REQ}}$ signal transmitted by the master to all of the slaves over line 22. The master processor outputs an address shortly after the start of the cycle, and it takes some additional time for address decoder 210 to operate and for the signal to be transmitted over the backplane. Consequently, the $\overline{\text{MEM REQ}}$ signal is delayed slightly relative to the start of the processor cycle. Waveform (6) depicts the LATCH ENABLE signal on each slave card, which is simply the $\overline{\text{CONTINUOUS 02}}$ signal as described above. The $\overline{\text{MEM REQ}}$ input to each slave card is inverted by inverter 176 and latched in latch 174. The resulting MREQ signal at the output of the latch on line 224 is shown in waveform (7).

Waveform (4) depicts the output of gate 110 on line 227. The two inputs to this gate are the $2 \times f_0$ and $4 \times f_0$ signals from the clock generator on each card. The output of the gate is low only when the two inputs of the gate are high. Thus waveform (4) is low only when both of waveforms (1) and (2) are high, as shown in the drawing. Each falling edge of the waveform at the output of gate 110 is used to clock flip-flop 166.

Comparator 172 has two sets of 4-bit inputs. The first set (B) is derived from latch 174, and represents the identity of the slave selected by the master. The (A) inputs are the four SLOT ID BITS on bus 34. The output of the comparator, A = B, is ordinarily low. But when the enable input is high, the output goes high if the (A) and (B) sets of inputs match. The enable input is connected to the M/S SLOT BIT which appears on line 26. Thus on the master card, the comparator is not enabled, its output is low, and the output of gate 170 remains high. But on any slave card, for which the M/S SLOT BIT is high, the output of the comparator goes high if the SLOT ID BITS match the slave identification which appears in latch 174.

But the output of gate 170 should not go low to indicate that the master wishes to access the slave memory unless the master really wants such an access. Because the contents of the page register on the master card remain on the page register bus, comparator 172 will continuously operate on every slave card to indicate a match (if there is one). For this reason, the MREQ output of latch 174 on line 224 is applied to the second input of gate 170. Only if the master desires to access a slave memory, and only if that slave memory is on a particular slave card, does the output of gate 170 on that card go low as shown in waveform (8).

The output of gate 170 is extended over line 216 to one input of gate 112. Line 216 is labeled $\overline{\text{PAGE REG-MREQ}}$ to indicate that it goes low whenever the master desires to access a slave memory, but only if the slave memory is on the respective processor card. It will be recalled that this is the third input to gate 112 which controls generation of the $\overline{\text{RAS}}$ signal which clocks a row address into the memory.

The output of gate 170 is inverted by inverter 168 and applied to one input of gate 162. This input thus goes high whenever a master access to the slave memory on the card is required. The other input to gate 162 is the inverted bus R/$\overline{\text{W}}$ signal which is latched in latch 164. Consequently, the output of gate 162 is ordinarily high, but it goes low whenever a write operation is required in a slave memory under control of the master. The output of gate 162 is connected to the I3 input of bus turn-around logic 200 and, as will be described below, controls a write operation in a slave memory in accordance with the address generated by the master processor. The low output of gate 162 is also coupled through gate 160 to the R/$\overline{\text{W}}$ input of memory 190, to control a write operation if it is a write cycle which is to take place. The other input to gate 160 is derived from the local R/$\overline{\text{W}}$ line 52 at the output of buffer 138. As will be described below, when a processor (master or slave) is to control an access to its own memory, the R/$\overline{\text{W}}$ signal of that processor is extended through buffer 138 to line 52. The signal is thus extended through gate 160 to inform the local memory whether a read or a write operation is to take place. (The signal is also extended to the I2 input of bus turn-around logic 200 and is used, as will be described below.) It should be noted that the local R/$\overline{\text{W}}$ signal generated by the master processor is extended not only through gate 160 to the master memory, but also through buffer 58 to the BUS R/$\overline{\text{W}}$ line 24 for extension to all of the slaves. But as just described, the signal thus delivered to each slave has no effect if the master is not accessing the memory for that slave card because the output of gate 170 is held high, thus forcing the output of gate 162 to remain high.

Assuming that refresh counter 42 has not determined that a refresh operation is to take place at the same time that the master is seeking access to a slave memory, the Q output of flip-flop 80 on every card is high. Thus the Q2 output of chip 86 is also high. Although this output is connected to the clear input of flip-flop 166, a positive potential at this input has no effect on the flip-flop. The output of gate 170 is connected to the J input of the flip-flop and the inverted signal is applied by inverter 168 to the K input. The flip-flop is clocked when the output of gate 110 goes low (waveform (4)). Thus the Q output of flip-flop 166 follows the output of gate 170, but only when gate 110 goes low. The first transition occurs at time $t_1$ (see waveform (4) of FIG. 14A), when the Q output goes low since the J input is low. At time $t_2$ there is no change because the output of gate 170 is still low. At time $t_3$, however, since the output of gate 170 (waveform (8)) has gone high, the Q output of flip-flop 166 goes high.

Waveform (10) depicts the output of gate 164. This output, line 226, is labeled PROCESSOR HOLD because whenever it goes low it causes the 6875 clock generator to suspend its operation inasmuch as line 226 is connected to the MEMORY READY input of the chip. When the output of gate 170 first goes low, since it is connected directly to one input of gate 164, the output of the gate goes low. Although the output of gate 170 goes high at the end of the cycle, the output of gate 164 is still held low because the Q output of flip-flop 166, connected to the second input of gate 164, is still low. Consequently, the MEMORY READY input of the clock generator on the selected slave card (assuming that a master access is in progress) goes low shorter after the start of the cycle, and remains low until shortly before the middle of the next cycle. The MEMORY READY input of the clock generator on the master card never goes low because the output of gate 170 on the master card remains high at all times since comparator 172 is not enabled. With the output of gate 170 high at all times on the master card, the Q output of flip-flop 166 is similarly high, and line 226 is held high since both inputs to gate 164 are high.

The 6875 clock generator chip starts sampling its MEMORY READY input on the negative edge of its $2 \times f_0$ clock while its 02 clock signal is rising. If the MEMORY READY input is low at this time, then the 6875 clock generator chip starts stretching its 02, MEMORY CLOCK and BUS 02 signals in the high state, and its 01 signal in the low state. On the next negative edge of the $2 \times f_0$ clock, if the MEMORY READY input is not low, then the 6875 chip drops its 02, MEMORY CLOCK and BUS 02 signals, and also releases its 01 clock on the following negative edge of the $2 \times f_0$ clock. Four such sampling times $t_a$, $t_b$, $t_c$ and $t_d$ are shown by the arrows on waveform (10) of FIG. 14A. Waveform (11) depicts the 02, MEMORY CLOCK and BUS 02 signals generated by the clock generator on a slave chip, in accordance with the state of its MEMORY READY input depicted in waveform (10).

At time $t_a$ in waveform (10), the MEMORY READY input is first sampled. At this time, the clock generator determines that the MEMORY READY input is low. The clock generator starts to stretch the 01, 02, MEMORY CLOCK and BUS 02 clocks while sampling the MEMORY READY input to determine when to release these clocks. Thus, while the 02 signal of waveform (11) would ordinarily go low at time $t_b$ (end of processor cycle), it does not do so. The next sampling occurs at time $t_b$ and since the MEMORY READY input is still low the stretching continues. It is only at time $t_c$ that the clock generator determines that the MEMORY READY input has gone high once again so that at time $t_d$ (the following negative edge of the $2 \times f_0$ clock) ordinary cycling is allowed to resume. The net result is that the 02 clock has been extended for one complete cycle, remaining in the high state, with the 01 clock (not shown) similarly being stretched in the low state.

The reason for this is as follows. The slave processor has no way of knowing at the start of a cycle whether the master will seek access to the slave memory. Consequently, the slave processor outputs an address on its address bus (and data on its data bus if a write cycle is required), and the slave processor expects its read/write cycle to terminate with the next falling edge of its 02 clock pulse. Although the address generated by the slave processor remains on its address bus (and its data remains on its data bus if a write cycle is required), the address and data buses are not coupled to the slave memory due to the action on the bus turn-around logic 200 as will be described below. At the end of the cycle, assuming that the master desires only a single access to the slave memory, the bus turnaround logic once again connects the slave processor address and data buses to the memory. There is no need for a 01 clock cycle since the slave processor went through this phase at the start of the previous cycle before the master assumed control over the slave memory. But at the end of the next cycle, the falling edge of the 02 pulse applied to the 02 input of the slave processor is in effect a continuation of the previous cycle which was aborted. This is why the 02 and 01 clock pulses are stretched for one complete cycle. In effect, the phase 1/phase 2 cycling of the slave processor is interrupted right in the middle and then resumed. In the event the master desires another access of the slave memory, the 01 and 02 outputs of the clock generator are simply stretched for another cycle in the same way; the master may gain access to a slave memory for as many successive cycles as it desires.

It will be recalled that flip-flop 78 generates the CONTINUOUS 02 signal on every card, and that its J input is connected to the MEMORY CLOCK output of the clock generator. But the MEMORY CLOCK output of the clock generator follows the 02 clock and is stretched whenever the MEMORY READY input to the clock generator goes low and suspends clock generator cycling. It is therefore important to understand why flip-flop 78 continues to generate a CONTINUOUS 02 clock even though the MEMORY CLOCK output of the clock generator may be held high for many successive processor cycles.

The flip-flop is clocked by negative transitions in the $2 \times f_0$ output of the clock generator, and this clock signal continues to run even when the MEMORY READY input is low. The negative transitions occur at times $t_a$ through $t_d$ waveform (10). The MEMORY CLOCK output of the clock generator is shown in waveform (11), having been stretched as described above. Since just prior to the first cycle shown in FIGS. 14A and 14B, the J input of flip-flop 78 is high together with the K input, flip-flop 78 switches state and its $\overline{Q}$ output goes low. Because the MEMORY CLOCK output of the clock generator is low just prior to time $t_a$ in waveform (10), the J input of flip-flop 78 is a 0 while the K input is a 1, and at time $t_a$ the flip-flop is placed in the 0 state with the $\overline{Q}$ output going high as shown in waveform (12). At each of times $t_b$ and $t_c$, the J input of the flip-flop is still high because the MEMORY CLOCK output of the clock generator is held high. Consequently, with both inputs of the flip-flop in the 1 state, the flip-flop switches state. The same thing happens at the end of the second cycle depicted in the drawing, at time $t_d$ (see waveform (11)). Thus the $\overline{Q}$ output of flip-flop 78 goes low. Because the J input is now low, at the next negative edge of the $2 \times f_0$ clock, flip-flop 78 is reset with the $\overline{Q}$ output going high. This is precisely what the $\overline{Q}$ output should do for a CONTINUOUS 02 signal to be generated.

With reference to FIG. 12, it will be recalled that if a refresh operation is required, the 01 and 02 signals are stretched for one complete cycle (see waveforms (8) and (9)). This stretching occurs on every card in the system, master and all slaves. The master card logic generates a $\overline{\text{REFRESH REQ}}$ signal from the middle of one cycle to the middle of the next cycle (see waveform (6) on FIG. 12), and the REFRESH GRANT signal on each card is generated for the duration of the next cycle (see waveform (7) on FIG. 12). During the cycle that the $\overline{\text{REFRESH REQ}}$ signal first goes low, the memory access in progress is completed, and it is during the next cycle that the phase clock signals are stretched so that a refresh operation can take place. But suppose that the master was accessing a slave memory when the $\overline{\text{REFRESH REQ}}$ signal line first went low. This presents an added complication on the slave card whose memory is being accessed by the master.

At the start of the first cycle, the slave processor outputs the appropriate bits on its address and data buses, as though it were going to access its respective memory. But during this cycle, as described above, the master assumes control. Without an ensuing refresh cycle, the slave phase clocks are stretched as just described from the middle of the first cycle to the middle of the second cycle so that at the end of the second cycle the memory will respond to the slave access, the overall slave access thus actually occurring during the first part of the first cycle and the last part of the second cycle. But if in the middle of the first cycle, the master card logic determines that a refresh operation is required (while it is accessing the slave memory), the second cycle is actually a refresh cycle. It is only in the third cycle that the slave access to the memory is completed. Thus what is required is the stretching of the slave phase clocks not for one cycle, but for two—from the middle of the first cycle to the middle of the third, so that at the end of the third cycle the slave processor can complete the memory access which it began at the beginning of the first. Waveforms (13)–(17) on FIG. 14B depict how this is accomplished.

Waveform (13) shows the $\overline{\text{REFRESH REQ}}$ pulse which occurs in the usual way from the middle of the first cycle to the middle of the second. Waveform (14) is the usual $\overline{\text{REFRESH GRANT}}$ pulse which lasts for the duration of the second cycle, during which a refresh operation takes place. Because the $\overline{\text{REFRESH GRANT}}$ signal at the Q output at flip-flop 80 is connected to the D2 input of flip-flop 86, and because the flip-flop is clocked by rising edges of the $4 \times f_0$ clock (which occur one-half of an O.CLK cycle after the REFRESH GRANT line goes low or high), the Q2 output of flip-flop 86 is delayed by one-half O.CLK clock cycle and it is the inverse of the REFRESH GRANT waveform (14), the Q2 output of flip-flop 86 being shown in waveform (15). The Q output of flip-flop 166 is shown in waveform (9) for the case where there is no refresh operation but where the master is accessing the slave memory. Even where there is a request from the master card to refresh all memories, the Q output of flip-flop 166 is still held low in the same way, and waveform (16), which depicts the Q output of flip-flop 166 when there is a command to refresh all memories, goes low in the usual way—even before the $\overline{\text{REFRESH REQ}}$ line goes low. While the Q output of the flip-flop is shown going high in waveform (9) at time $t_3$ (see waveform (4)), by this time the Q2 output of flip-flop 86 is low, and it is connected to the clear input of flip-flop 166 over line 229. Consequently, flip-flop 166 remains cleared with its Q output low until the Q2 output of flip-flop 86 goes high. It is thus apparent that waveform (16) is low for as long as either one of waveforms (9) or (15) is low.

Referring to waveform (10), it will be recalled that the $t_a$–$t_d$ arrows represent the times when the clock generator samples the MEMORY READY input. Waveform (17) depicts the resulting 02 clock signal generated by the slave clock generator when a request to refresh the memories comes up in the middle of a master access to the slave memory. At the start of the first cycle, the slave 02 clock signal goes low as usual. At time $t_a$, the clock generator samples its MEMORY READY input and sees that it is low. Thus the clock generator starts to stretch the 01, 02, MEMORY CLOCK and BUS 02 clocks. By this time the 02 clock has gone high as shown in waveform (17).

There is no change in the state of the 02 clock since at sampling times $t_b$ and $t_c$ the MEMORY READY input of the clock generator is still low. Even at sampling time $t_d$ (see waveform (16)), the MEMORY READY input is still low so clock generator cycling is still suspended. It is only at sampling time $t_e$ that the clock generator sees the MEMORY READY input low. Thus at time $t_f$, cycling is allowed to resume. It is only at the end of the third cycle that the slave 02 clock goes low. It is at this time that the slave processor completes its access to its respective memory—the access which began at the start of the first cycle when, as shown in waveform (17), the 02 signal went low.

BUS TURN-AROUND LOGIC 200 AND BUS BUFFERS

While the processor and memory timings have been considered, it has been assumed thus far that the correct address and data buses are always connected to a memory. That is, on the master card the master processor address and data buses are coupled to the master memory when a master memory access is required, and they are coupled to the backplane when a slave memory access is required; on a slave card the slave processor address and data buses are coupled to the respective slave memory, but when a master access to the memory is required it is the address and data buses in the backplane that are coupled to the slave memory. Bus turn-around logic 200 and the buffers which it controls ensure that the proper connections are made.

Figures 6, 7:
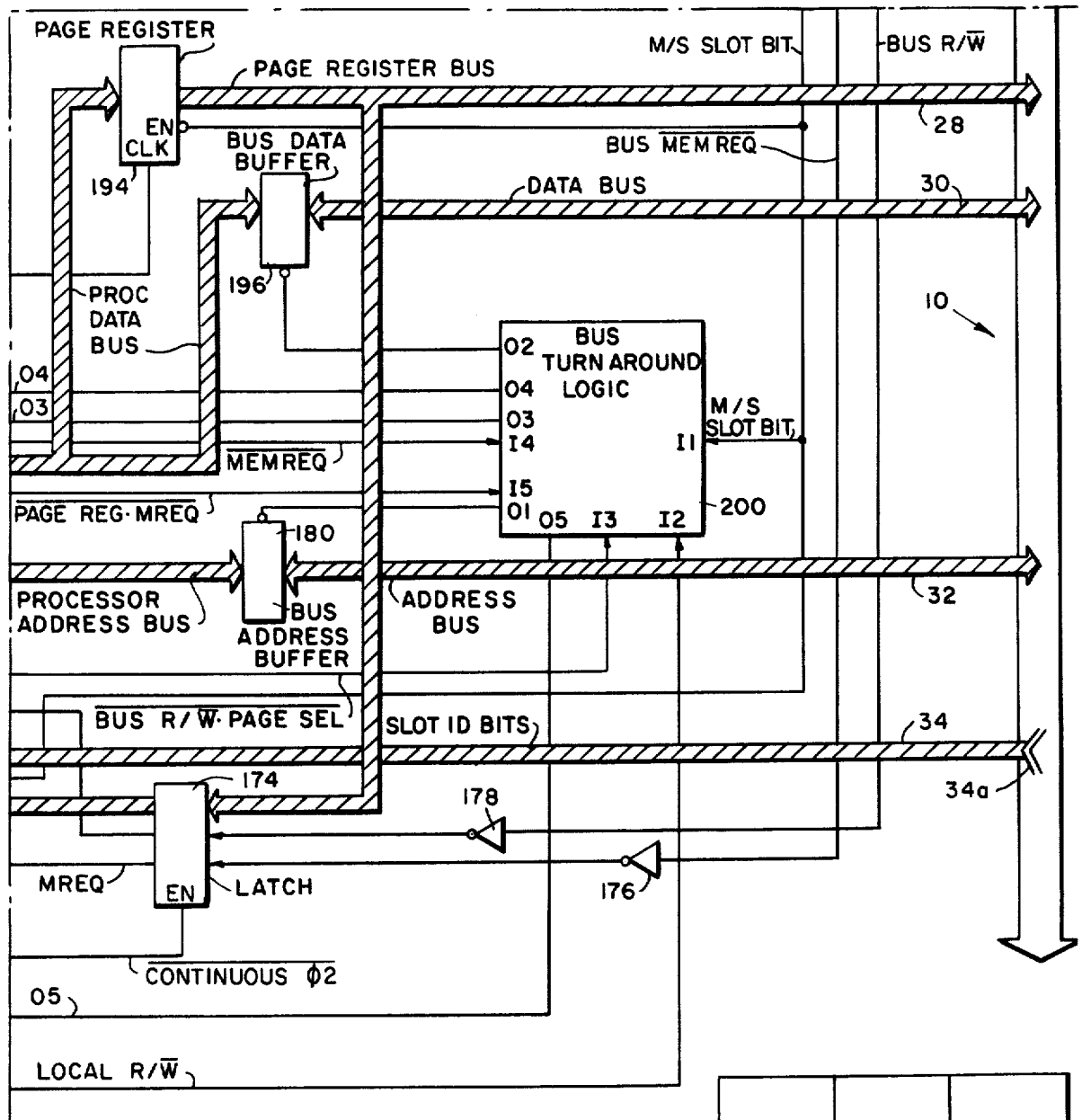

The system of FIGS. 1–6 includes several buffers for connecting buses to each other. For example, consider bus address buffer 180. This buffer can connect address bus 32 in the backplane to processor address bus 140 on the card. In the case of a master which wants to access a selected slave, the address on the processor address bus (generated by the master processor) must be transmitted through buffer 180 to the backplane address bus. On the other hand, in the selected slave the bus address buffer 180 must allow transmission through it in the opposite direction—from the backplane to the processor address bus, from which it is extended to multiplexer 186. In FIG. 6, bus address buffer 180 is shown as a single unit, controlled by a single command lead O1. In actual practice, however, two separate tri-state buffers 180a, 180b are provided, one for controlling transmission in each direction, and there are two control leads O1a and O1b for enabling operations of the respective buffers. On FIG. 8, which depicts the bus turn-around logic block 200, pairs of buffers with pairs of enable lines are shown, wherever there are in reality two buffers instead of only one.

Before proceeding to a detailed description of the bus turn-around logic, the various buffers will be described. Just as bus address buffer 180 determines the direction in which an address is transmitted, bus data buffer 196 determines the direction of data transfer. There are in reality two bus data buffers 196a, 196b as well as two enable lines O2a, O2b. If the master is performing an operation on its own memory, there is no need for it to enable either of its bus data buffers. On the other hand, if a read or write operation is being performed on a slave memory, one of the two buffers should be enabled for allowing data to be transmitted to the backplane or to be received from it. Similar remarks apply to each slave card. A selected slave should allow a data transfer in one of the two directions, while an unselected slave should not. Along the same line, there are in reality two processor data buffers 130 on each card. For example, in the case of a slave whose memory is being accessed by the master, both processor data buffers should be held off since data is not delivered to the local processor when the master is performing a read operation, and the local processor does not apply data bits to processor data bus 142. All of the necessary processor data buffer operations will be discussed below.

Processor address buffer 134 includes only a single buffer element, unlike the other three just considered. Addresses are never transmitted to a microprocessor, and consequently processor address buffer 134 simply controls the transmisson of a processor-generated address on bus 132 to the processor address bus 140. In the master, the buffer can always be enabled since the master address is always delivered to processor address bus 140—whether a memory operation is to be performed on the master memory, or on one of the slave memories.

Finally, VMA/LOCAL R/$\overline{W}$ buffer 138 is a single-unit device which simply transmits two signals from the processor. In the master, the buffer should always be enabled because the master R/$\overline{W}$ and VMA signals are required whether the master is accessing its local memory or one of the slave memories. But in a slave unit, the slave processor signals should not be extended to lines 52 and 144 if the master is accessing the respective slave memory. It should be noted that decoder 210 on each card operates on its 16 address bit inputs when its respective processor's VMA output goes high, but only if buffer 138 is enabled.

Bus turn-around logic 200 includes five inputs I1-I5. The inputs are as follows:

I1—M/S SLOT BIT: This is the unique bit on each card which identifies the card as being either a master or a slave.

I2—LOCAL R/$\overline{W}$: The state of this line is an indication of the kind of memory operation required by the local processor, the signal being superseded by the bus R/$\overline{W}$ signal from the master should the master desire access to the memory on a particular slave card.

I3—BUS R/$\overline{W}$·PAGE SEL: This line is normally high. It goes low only in a slave selected by the master (whose comparator 172 operates), and then only if the master desires to write a byte in that slave's memory.

I4—$\overline{\text{MEM REQ}}$: This line goes low only on the master card when the master desires access to a slave memory, i.e., when it generates an address in the range 4000-7FFF.

I5—$\overline{\text{PAGE REG·MREQ}}$: This line is always high on the master card. It goes low on a slave card only when the master desires access to the slave's memory.

The bus turn-around logic 200 is shown on FIG. 6 as having five output conductors O1-O5, each extended to a respective one of the five buffers discussed immediately above. Three of these output lines (O1, O2 and O4) are in reality two lines each, since each of buffers 180, 196 and 130 is in reality two tri-state buffers connected in parallel for controlling transmission in opposite directions.

The bus turn-around logic block 200 is shown in detail in FIG. 8. Each of the five buffers will be considered individually. On FIG. 8, with respect to the three buffer pairs 180, 196 and 130, an arrow facing to the right indicates a direction toward the backplane, while an arrow facing to the left indicates a transmission direction from the backplane to the card.

Bus Address Buffer 180

The M/S SLOT BIT in the master is a 0. With the I1 input low, line O1a is low and buffer 180a is always enabled. The master always transmits its address to the backplane, even when it is accessing its own memory. There is no need to disable buffer 180a because whenever a slave memory is not to be accessed by the master processor, its bus address buffer 180b is disabled so that the master address bits are prevented from appearing on the slave's processor address bus.

In a slave, the M/S SLOT BIT is a 1, and the I1 input is high. Thus bus address buffer 180a in every slave is disabled so that a slave-generated address is not extended to the backplane.

Since slave processors cannot access the master's memory, there is never a need to enable bus address buffer 180b in the master. Since one input of gate 262 is connected to the M/S SLOT BIT whose value is a 0 in the master, the output of gate 262 is low. Since a low-level signal always appears on output line O1b on the master card, its bus address buffer 180b is permanently disabled.

On each slave card, the I1 input is a 1 so that one input of gate 262 is high. But output line O1b should go high on a slave card to allow the inputting of an address from the backplane only if the master desires access to the particular slave. Input I5 goes low only when the master desires access to some slave, and only if it is this particular slave to whose memory access is required. In such a case, the I5 input is low, the output of inverter 260 is high, and the other input of gate 262 is enabled, thus allowing the operation of bus address buffer 180b.

VMA/Local R/$\overline{W}$ Buffer 138

On the master card, the M/S slot bit is a 0. Since the I1 input is connected directly to one input of gate 261, its output O5 is low and buffer 138 is enabled. This is as it should be; on the master card, the R/$\overline{W}$ and VMA signals from the master processor are always required, whether for a local operation or an operation on a slave memory.

On a slave card, the I1 bit is high and thus has no effect on gate 261. If the slave memory is not being accessed by the master, input I5 is high. Since this input is inverted by inverter 260 before application to the other input of gate 261, the output of gate 261 (output line O5) is low and buffer 138 is enabled—the slave card requires its VMA and R/$\overline{\text{W}}$ signals in order for the slave processor to access its own memory. But in any slave whose memory is being accessed by the master, input I5 is low. With both inputs to gate 261 high, the output O5 is similarly high and buffer 138 is disabled. Since control over the slave memory is assumed by the master, buffer 138 should not operate in the slave.

Bus Data Buffer 196

The control over bus data buffer 196a, 196b is more complicated because many cases must be considered. Operations of the bus data buffers depend not only on the type of card involved and whether the master is seeking access to a slave, but also on whether a read or write operation is being performed. It will be helpful to first consider operation of the buffers on the master card, and then on the slave cards.

Master Card

Input I5 is always high on the master card since comparator 172 is permanently disabled. Thus one input of gate 248 is always high. Because the slot bit input I1 is always low, the output of gate 246 is always high.

Consider first the case in which the master accesses its own memory. In this case the master's $\overline{\text{MEM REQ}}$ line (input I4) is high. With both inputs of gate 248 high, its output is low. This forces the output of gate 250 (output line O2a) to be low, so that no data is transmitted from the master to the backplane data bus. The low potential at the output of gate 248 also causes the output of gate 254 to be high to disable buffer 196b over output line O2b. Consequently, no data is applied to the master processor data bus from the backplane.

Consider now the case in which the master does seek access to a slave memory, with its I4 input thus being low. This causes the output of gate 248 to go high. One of buffers 196a, 196b should be enabled, depending on whether a read operation or a write operation is to be performed on the slave memory. On the master card, the I3 input is always high. Consequently, the output of gate 234 depends on the master's local R/$\overline{\text{W}}$ signal. If a write operation is to be performed on a slave memory, the I2 input on the master card is low and the output of gate 234 is low. The output of gate 240 goes high to enable one input of gate 242. The other input is connected through inverter 232 to the M/S SLOT BIT on the master which is a 0. Consequently, both inputs of gate 242 are high and its output goes low. With a low input to gate 244, the output goes high. One input of gate 250 is high, as described above, when an access to a slave memory is required. Consequently, the output of gate 250 goes high to enable bus data buffer 196a. This is as required because on a write operation the master should transmit data to the backplane. Although one input of gate 254 is also high since it is connected to the output of gate 248, the high output of gate 244 is inverted by inverter 252 to provide a low potential at the second input of gate 254. Consequently, the output of gate 254 goes high to disable buffer 196b; data is to be delivered to the backplane and not from it.

On the other hand, in the case of a read operation controlled by the master on a slave memory, the master local R/$\overline{\text{W}}$ signal (input I2) is high. With both inputs to gate 234 high, the output is similarly high. Inverter 240 applies a low signal to one input of gate 242. The output of gate 242, an input of gate 244, is thus high. On the master card, the output of gate 246 is always high and thus both inputs to gate 244 are high. The output of the gate is now low, as opposed to its high condition in the case of a write operation. The output of gate 250 is now low to disable buffer 196a. But because of inverter 252, both inputs to gate 254 are now high so output line O2b goes low to enable buffer 196b. Consequently, data appearing on the backplane from the selected slave memory is passed through buffer 196b to the master processor data bus.

Slave Card

If the master is not accessing any slave, then on each slave card inputs I4 and I5 are both high. In such a case, the output of gate 248 is low. This causes the output of gate 250 to be low and the output of gate 254 to be high, disabling both of buffers 196a and 196b. This is as required because each slave operates on its own memory.

Consider next the case in which the master accesses a slave, but not this particular slave. In such a case, the I5 input is high on the slave card just as it is when the master accesses its own memory. When the master accesses its own memory, the master address does not appear on the slave's processor address bus. It is the slave-generated address which appears on this bus. Since the slave processor always generates an address in the 0000–3FFF range, its $\overline{\text{MEM REQ}}$ output of address decoder 210 is high. Consequently, input I4 is high just as it is when the master accesses its own memory. With both of inputs I4 and I5 high, bus data buffers 196a, 196b are disabled just as they are when the master accesses its own memory.

But suppose that the master desires access to the slave memory. In this case, the slave's VMA/local R/$\overline{\text{W}}$ buffer 138 is disabled, as described above, and the two outputs of tri-state buffer 138 are pulled high by resistors connected to V+. Since the slave's decoder 210 is not enabled, its $\overline{\text{MEM REQ}}$ decoder output (input I4 to the bus turn-around logic) is high. Since the slave's local R/$\overline{\text{W}}$ output from buffer 138 is also high, input I2 has no effect on gate 234. If a write operation is to be performed, then the I3 input is low and the output of gate 234 is similarly low. The output of gate 244 is not affected through gate 242 because on the slave card one input to gate 242 is always low (due to the high I1 input), and the output of gate 242 is high. But the low input at the output of gate 234 causes the output of gate 246 to be high. With both inputs to gate 244 being high, the output is low. Thus the output of gate 250 is low to disable buffer 196a since data is to be written in the slave memory, not read from it. As for gate 254 the low output of gate 244 is inverted by inverter 252 to enable one input of gate 254. Since input I5 is low in the selected slave, the output of gate 248 is high to enable the second input of gate 254. The gate output thus goes low to enable buffer 196b so that the data to be written is taken from the backplane.

But if it is a read operation which is to be performed, input I3 is high and the output of gate 234 is high. The output of gate 246 is now low so that the output of gate 246 is high. In this case it is buffer 196a which is enabled rather than buffer 196b.

Processor Address Buffer 134

On the master card, input I5 is always high. Since this input is connected directly over line O3 to the enable input of buffer 134, the master processor always transmits its generated address to bus 140. This is as required because the address must appear on this bus whether it is for use on the local memory or on one of the slave memories.

On a slave card, the processor address buffer 134 should normally be enabled, and it is since input I5 is normally high. The buffer should be disabled only if the master desires access to a slave memory, and only if it is this particular slave whose memory is to be acted upon. This is precisely when input I5 on any slave card goes low. Thus the direct connection of input I5 to the enable input of buffer 134 disables the processor address buffer only on a particular slave card whose memory is being accessed by the master.

Processor Data Buffer 130

On the master card, input I5 is always high, thus enabling one input of each of gates 236 and 238. Input I3 is also always high, and thus the output of gate 234 depends upon the local R/$\overline{W}$ input I2. In the case of a read operation, this input is high and the output of gate 234 is high. With both inputs to gate 236 high, its output is low to enable buffer 130a, thus allowing data read out of the master or a slave memory to be transmitted through buffer 130a to the data bus input of the processor. With the output of gate 236 low, the output of gate 238 is low, thus disabling buffer 130b.

On the other hand, in the case of a write operation, input I2 on the master card is low, and the output of gate 234 is low. The output of gate 236 is now high to disable buffer 130a. With both inputs to gate 238 now high, its output is similarly high to enable buffer 130b. This allows data to be transferred from the microprocessor to the processor data bus 142, from which it is sent to either the master memory or a slave memory.

A slave card which is not selected, even though the master is accessing another slave, operates in the same way that the master does. Its I5 input remains high as does its I3 input. Consequently, it is the local R/$\overline{W}$ (I2 input) signal which determines which of buffers 130a, 130b operates, i.e., the direction of data transfer between the slave processor and the slave memory.

But if the master is making an access to the slave memory, input I5 is low. With one input to each of gates 236 and 238 low, the output of gate 236 is high and the output of gate 238 is low. Both of buffers 130a, 130b are disabled because there is to be no data transfer between the slave memory and the slave processor.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A data processing system having a master processor and at least two slave processors; a master memory and a plurality of slave memories, with each slave processor having access only to a respective slave memory and with the master processor having access both to the master memory and to all of the slave memories; a common bus shared by all of said processors; each processor having its own address/data bus connecting it to its respective memory, and said master processor and said slave processors having means connected to said common bus for controlling said master processor to transmit address and data signals to said slave memories and for controlling said slave memories to transmit data signals to said master processor; each of said processors including means for generating phase clock signals to enable an access to its respective memory during a respective processor cycle; and control means in said master processor and in each of said slave processors, connected over said common bus, for causing said master processor to synchronize the phase clock signals in each of said slave processors, and at any time to disable the access by any selected slave processor to its respective memory for no longer than the single processor cycle during which said master processor accesses such respective slave memory and said selected slave processor would otherwise access such respective slave memory.

2. A data processing system in accordance with claim 1 wherein said master processor synchronizes the phase clock signals in said slave processors by applying less than all of its phase clock signals to said common bus together with a control clock signal whose frequency is higher than those of all of said phase clock signals.

3. A data processing system in accordance with claim 2 wherein said master processor generates interruptable phase clock signals but applies none of them to said common bus and, in addition to said higher clock frequency, said master processor applies to said common bus a continuous clock signal which has a frequency equal to that of one of its interruptable phase clock signals.

4. A data processing system in accordance with claim 3 wherein all of said processors are identical in configuration and each can function as either the master or a slave, and each of said processors includes hardware connection means for determining whether the processor functions as a master or a slave.

5. A data processing system in accordance with claim 1 wherein the control means in a selected slave processor suspends the generation of phase clock signals while the master processor is accessing the respective slave memory and then allows them to be generated again at the end of the cycle during which said master processor accesses the respective slave memory, all of the other slave processors continuing to generate their own phase clock signals to enable accesses to their respective memories while said master processor accesses said respective slave memory.

6. A data processing system in accordance with claim 1 wherein all of said processors are identical in configuration and each can function as either the master or a slave, and each of said processors includes hardware connection means for determining whether the processor functions as a master or a slave.

7. A data processing system having a master processor and at least two slave processors; a master memory and a plurality of slave memories, with the master processor having access both to the master memory and to at least two of the slave memories; a common bus; each processor having its own address/data bus connecting it to a respective memory, and said master processor and the at least two slave processors associated with said at least two slave memories having means connected to said common bus for controlling said master processor to transmit address and data signals to said at least two slave memories and for controlling said at least two slave memories to transmit data signals to said master processor; each of said processors including means for generating phase clock signals to enable an access to its respective memory during a respective processor cycle; and control means in said master processor and in each of said at least two slave processors, connected over said common bus, for disabling at any time the access by any selected one of said at least two slave processors to its respective memory while said master processor accesses such respective slave memory for no longer than the single processor cycle during which such master processor access takes place and said selected slave processor would otherwise access such respective slave memory.

8. A data processing system in accordance with claim 7 further comprising means for synchronizing said at least two slave processors to said master processor, said synchronizing means including means in said master processor for applying less than all of its phase clock signals to said common bus together with a control clock signal whose frequency is higher than those of all of said phase clock signals, and means in each of said at least two slave processors for operating on said applied signals to control the generation of all of said phase clock signals.

9. A data processing system in accordance with claim 8 wherein said master processor generates interruptable phase clock signals but applies none of them to said common bus and, in addition to said control clock signal, said master processor applies to said common bus a continuous clock signal which has a frequency equal to that of one of its interruptable phase clock signals.

10. A data processing system in accordance with claim 7 wherein the control means in a selected slave processor suspends the generation of phase clock signals while the master processor is accessing the respective slave memory and then causes them to be generated again at the end of the cycle during which said master processor accesses the respective slave memory, all of the other slave processors continuing to generate their own phase clock signals to enable accesses to their respective memories while said master processor accesses said respective slave memory.

11. A data processing system in accordance with claim 7 wherein all of said processors are identical in configuration and each can function as either the master or a slave, and each of said processors includes hardware connection means for determining whether the processor functions as a master or a slave.

12. A data processing system having a master processor and at least two slave processors; a master memory and a plurality of slave memories, with the master processor having access to the master memory and priority access to all of the slave memories; a common bus shared by all of said processors; each processor having its own address/data bus connecting it to a respective memory, and said master processor and said slave processors having means connected to said common bus for controlling said master processor to transmit address and data signals to said slave memories and for controlling said slave memories to transmit data signals to said master processor; each of said processors including means for generating phase clock signals to enable an access to its respective memory during a respective processor cycle; and control means in said master processor and in each of said slave processors, connected over said common bus, for causing said master processor to synchronize the phase clock signals in each of said slave processors, and to inhibit at any time the access by any selected slave processor to its respective memory during no longer than the single processor cycle during which said master processor accesses such respective slave memory and said selected slave processor would otherwise access such respective slave memory.

13. A data processing system in accordance with claim 12 wherein said master processor synchronizes the phase clock signals in said slave processors by applying less than all of its phase clock signals to said common bus together with a control clock signal whose frequency is higher than those of all of said phase clock signals.

14. A data processing system in accordance with claim 13 wherein said master processor generates interruptable phase clock signals but applies none of them to said common bus and, in addition to said higher clock frequency, said master processor applies to said common bus a continuous clock signal which has a frequency equal to that of one of its interruptable phase clock signals.

15. A data processing system in accordance with claim 14 wherein all of said processors are identical in configuration and each can function as either the master or a slave, and each of said processors includes hardware connection means for determining whether the processor functions as a master or a slave.

16. A data processing system in accordance with claim 12 wherein the control means in a selected slave processor suspends the generation of phase clock signals while the master processor is accessing the respective slave memory and then causes them to be generated again at the end of a master processor cycle during which said master processor accesses the respective slave memory, all of the other slave processors continuing to generate their own phase clock signals under control of said master processor to enable accesses to their respective memories while said master processor accesses said respective slave memory.

17. A data processing system in accordance with claim 12 wherein all of said processors are identical in configuration and each can function as either the master or a slave, and each of said processors includes hardware means for determining whether the processor functions as a master or a slave.

18. A data porcessing system in accordance with claim 17 wherein the determining means in each of said processors includes a signal line whose potential determines whether the processor functions as a master or a slave; and wherein each of said processors is contained on a respective circuit card with all of the circuit cards being inserted in a backplane which carries said common bus, said backplane including means for applying selected potentials to all of said determining means signal lines to control which of said processors functions as a master with the others functioning as slaves.

19. A data processing system having a master processor and at least two slave processors; a master memory and a plurality of slave memories, with each slave processor having access to a respective slave memory and with the master processor having access to both the master memory and to all of the slave memories; a common bus shared by all of said processors; each processor having its own address/data bus connecting it to its respective memory, and said master processor and said slave processors having means connected to said common bus for controlling said master processor to transmit address and data signals to said slave memories and for controlling said slave memories to transmit data signals to said master processor; each of said processors including clock-generating means for generating two phase clock signals to enable an access to its respective memory during a respective processor cycle, the processor outputting address signals during the first of said phase clock signals and a memory operation then taking place during the second of said phase clock signals; and control means in said master processor and in each of said slave processors, connected over said common bus, for causing said master processor to synchronize the phase clock signals in each of said slave processors, and to disable at any time the access by any selected slave processor to its respective memory for no longer than the single processor cycle during which said master processor accesses such respective slave memory and said selected slave processor would otherwise access such respective slave memory.

20. A data processing system in accordance with claim 19 wherein the control means in each slave processor allows the outputting of address signals by the slave processor to its respective memory during the first of said phase clock signals even if during a particular processor cycle an access is to be made to the respective slave memory by the master processor; the control means, in the event of such an access, then inhibiting the generation of the second phase clock signal of said particular processor cycle and the first phase clock signal of the next processor cycle so that the operation on the slave memory in accordance with the outputted address signals takes place during the second phase clock signal of said next processor cycle.

21. A data processing system in accordance with claim 20 wherein said memories are dynamic semiconductor memories and said master processor further includes means for controlling a simultaneous refresh operation in all of said memories by suspending the generation of both phase clock signals by every processor for a single processor cycle; and wherein the control means in each slave processor, responsive to an access to the respective slave memory by the master processor followed by a refresh operation, inhibits the generation of the second phase clock signal of said next processor cycle and the generation of the first phase clock signal of the succeeding processor cycle so that the operation on the slave memory in accordance with the outputted address signals takes place during the second phase clock signal of said succeeding processor cycle.

22. A data processing system in accordance with claim 21 wherein each of said processors includes a microprocessor selected from a 6800-series chip set.

23. A data processing system in accordance with claim 22 wherein each of said clock-generating means is a 6875 clock generator.

24. A data processing system having a master processor, a first memory and at least two second memories; with said first memory being accessed by said master processor specifying an address in a first address space and said at least two second memories being accessed by said master processor specifying an address in a second, different, address space; address and data buses connected between said master processor and all of said memories; register means, settable by said master processor, for selectively identifying a particular one of said second memories; means connected to said first memory and said at least two second memories and said address and data buses, responsive to said master processor specifying an address in said second address space for accessing the particular one of said second memories identified by said register means; whereby, following setting of said register means by said master processor, said master processor can access said first memory or the identified particular second memory by specifying a respective address in said first or second address space without requiring a subsequent setting of said register means until such time that access by said master processor to another of said second memories is required; said register means being set by said master processor specifying an address which is in neither of said first and second address spaces, with said register means being set to identify a particular one of said second memories in accordance with data appearing on said data bus; and a plurality of additional processors each for accessing a respective one of said second memories by specifying an address in said second address space.

25. A data processing system in accordance with claim 24 further including means responsive to simultaneous access attempts to one of said second memories by said master processor and the respective one of said additional processors for giving priority to said master processor and suspending operation of said respective additional processor until after said master processor has accessed said one of said second memories.

26. A data processing system in accordance with claim 25 further including means for synchronizing the operations of said master processor and said additional processors such that operation of one of said additional processors is suspended for only a single processor cycle during which time the respective one of said second memories is accessed by said master processor.

27. A data processing system having a master processor, a first memory and at least two second memories; with said first memory being accessed by said master processor specifying an address in a first address space and said at least two second memories being accessed by said master processor specifying an address in a second, different, address space; address and data buses connected between said master processor and all of said memories; register means, settable by said master processor, for selectively identifying a particular one of said second memories; means connected to said first memory and said at least two second memories and said address and data buses, responsive to said master processor specifying an address in said second address space for accessing the particular one of said second memories identified by said register menas; whereby, following setting of said register means by said master processor, said master processor can access said first memory or the identified particular second memory by specifying a respective address in said first or second address space without requiring a subsequent setting of said register means until such time that access by said master processor to another of said second memories is required; and a plurality of additional processors each for accessing a respective one of said second memories by specifying an address in said second address space.

28. A data processing system in accordance with claim 27 further including means responsive to simultaneous access attempts to one of said second memories by said master processor and the respective one of said additional processors for giving priority to said master processor and suspending operation of said respective additional processor until after said master processor has accessed said one of said second memories.

29. A data processing system in accordance with claim 28 further including means for synchronizing the operations of said master processor and said additional processors such that operation of one of said additional processors is suspended for only a single processor cycle during which time the respective one of said second memories is accessed by said master processor.

* * * * *